(12) United States Patent
Subrahmanian et al.

(10) Patent No.: US 8,296,168 B2
(45) Date of Patent: Oct. 23, 2012

(54) SYSTEM AND METHOD FOR ANALYSIS OF AN OPINION EXPRESSED IN DOCUMENTS WITH REGARD TO A PARTICULAR TOPIC

(75) Inventors: Venkatramanan Siva Subrahmanian, Potomac, MD (US); Diego Recupero Reforgiato, Hyattsville, MD (US); Antonio Picariello, Montefredane (IT); Bonnie J. Dorr, Laurel, MD (US); Carmine Cesarano, Somma Vesuviana (IT); Amelia Sagoff, Bethesda, MD (US)

(73) Assignee: University of Maryland, College Park, MD (US)

( * ) Notice: Subject to any disclaimer, the term of this patent is extended or adjusted under 35 U.S.C. 154(b) by 1288 days.

(21) Appl. No.: 11/808,278

(22) Filed: Jun. 8, 2007

(65) Prior Publication Data

US 2010/0023311 A1    Jan. 28, 2010

Related U.S. Application Data

(60) Provisional application No. 60/825,506, filed on Sep. 13, 2006, provisional application No. 60/826,110, filed on Sep. 19, 2006.

(51) Int. Cl.
*G06Q 10/00* (2012.01)
(52) U.S. Cl. ...................................... 705/7.11
(58) Field of Classification Search .................. 705/7.11
See application file for complete search history.

(56) References Cited

U.S. PATENT DOCUMENTS

| | | | | |
|---|---|---|---|---|
| 5,675,819 A * | 10/1997 | Schuetze | ......................... | 704/10 |
| 5,940,843 A * | 8/1999 | Zucknovich et al. | ......... | 715/210 |
| 5,987,402 A * | 11/1999 | Murata et al. | ..................... | 704/2 |
| 2002/0062368 A1* | 5/2002 | Holtzman et al. | ............ | 709/224 |
| 2003/0093261 A1* | 5/2003 | Abir | ................................ | 704/2 |
| 2003/0101166 A1* | 5/2003 | Uchino et al. | ........................ | 1/1 |
| 2004/0122656 A1* | 6/2004 | Abir | ................................. | 704/4 |
| 2005/0091038 A1* | 4/2005 | Yi et al. | .......................... | 704/10 |
| 2005/0125216 A1* | 6/2005 | Chitrapura et al. | ............... | 704/1 |
| 2005/0187932 A1* | 8/2005 | Kanayama et al. | ............... | 707/6 |
| 2006/0069589 A1* | 3/2006 | Nigam et al. | ..................... | 705/1 |
| 2006/0080161 A1* | 4/2006 | Arnett et al. | ................. | 705/7.31 |
| 2006/0200342 A1* | 9/2006 | Corston-Oliver et al. | ...... | 704/10 |
| 2006/0242040 A1* | 10/2006 | Rader | ................................. | 705/35 |
| 2008/0005051 A1* | 1/2008 | Turner et al. | ................... | 706/20 |
| 2008/0082499 A1* | 4/2008 | Koski | ................................ | 707/3 |

OTHER PUBLICATIONS

PLUS Search, May 26, 2011.*
Cesarano, Carmine, Dorr, Bonnie, Picariello, Antonio, Reforgiato, Diego, Sagoff, Amelia and Subrahmanian, V.S. "OASYS: An Opinion Analysis System." American Association for Artificial Intelligence, 2005.*

(Continued)

*Primary Examiner* — Beth V Boswell
*Assistant Examiner* — Renae Feacher
(74) *Attorney, Agent, or Firm* — Rosenberg, Klein & Lee

(57) ABSTRACT

System and method for analysis of an opinion expressed in documents on a particular topic computes opinion strength on a continuous numeric scale, or qualitatively. A variety of opinion scoring techniques are plugged in to score opinion expressing words and sentences in documents. These scores are aggregated to measure the opinion intensity of documents. Multilingual opinion analysis is supported by capability to concurrently identify and visualize the opinion intensity expressed in documents in multiple languages. A multi-dimensional representation of the measured opinion intensity is generated which is agreeable with multi-lingual domain.

23 Claims, 16 Drawing Sheets

OTHER PUBLICATIONS

Wilson, Thersa, Hoffman, Paul, Somasundaran, Swapna, Kessler, Jason, Wiebe, Janyce, Choi, Yejin, Cardie, Claire, Riloff, Ellen, Patwardhan "OpnionFinder: A system for subjectivity analsysis." Aug. 2005.*

Recupero, Diego Reforgiato."Opinion Analysis System." UMIACS (University of Maryland), Apr. 2006.*

Google Scholar Search Results dated Jun. 15, 2011.*

Deerwester, Scott, Dumais, Susan T., Furnas, George W., Landauer, Thomas K. and Harshman, Richard."Indexing by Latent Semantic Analysis." 1990.*

Littman, M.L. and Turney, P."Measuring Praise and criticism: Inference of Semantic Orientation from Association." National Research Counceil of Canada, Institue for Information Technology, Oct. 2003.*

Wilson, Theresa, Hoffmann, Paul, Somasundaran, Swapna, Kessler, Jason, Wiebe, Hanyce, Choi, Yejin, Cardie, Clarire, Riloff, Ellen and Patwardhan, Siddharth. "OpinionFinder: A system for subjectivity analysis." University of Pittsburgh, PA, Cornell University Ithaca, NY and Univerisyt of Utah, Salt Lake City Utah, May 2005.*

Hatzivassiloglou, Vasileios and McKeown, Kathleen."Predicting Semantic Orientation of Adjectives." Department of Computer Science, Columbia University, New York.*

Pang, Bo; Lee, Lillian and Vaithyanathan, Shivakumar." Thumbs up? Sentiment Classification using Machine Learning techniques." IBM Almaden Research Center, California and Cornell University, New York, 2002.*

Franco Salvetti, et al., "Automatic Opinion Polarity Classification of Movie Reviews", Colorado Research in Linguistics, Jun. 2004, vol. 17, Issue 1, Boulder: University of Colorado, pp. 1-15.

Peter D. Turney, "Thumbs Up or Thumbs Down? Semantic Orientation Applied to Unsupervised Classification of Reviews", Proceedings of the 40th Annual Meeting of the Association for Computational Linguistic (ACL), Philadelphia, Jul. 2002, pp. 417-424.

Bo Pang, et al., "Thumbs Up? Sentiment Classification Using Machine Learning Techniques", Proceedings of the 2002 Conference on Empirical Methods in Natural Language Processing (EMNLP) 2002, pp. 79-86.

V. Hatzivassiloglou, et al., "Predicting the Semantic Orientation of Adjectives", Proceedings of the 35th Annual Meeting of the Association for Computational Linguistic, 1997, pp. 174-181.

T. Wilson, et al., "Just How Mad Are You? Finding Strong and Weak Opinion Clauses", Proceeding AAAI-04.

Deerwester, et al., 1990 "Indexing by Latent Semantic Analysis", Journal of the American Society for Information, pp. 391-407, 1990.

Cesarano, et al., "OASYS: An Opinion Analysis System", 2005, available at: http://www.umiacs.umd.edu/research/LCCD/pubs/OASYS-AAAI.ps.

* cited by examiner

SYSTEM AND METHOD FOR ANALYSIS OF AN OPINION EXPRESSED IN DOCUMENTS WITH REGARD TO A PARTICULAR TOPIC

RELATED APPLICATION DATA

This Utility Patent Application is based on Provisional Patent Applications No. 60/825,506 filed 13 Sep. 2006 and No. 60/826,110 filed 19 Sep. 2006.

STATEMENT REGARDING FEDERALLY SPONSORED RESEARCH

The invention described herein was developed through research funded under NSA Contract #H9823005C0425. The U.S. Government has certain rights to the invention.

FIELD OF THE INVENTION

The present invention relates to opinion analyses; and in particular to an opinion analysis architecture capable of quantitative and qualitative assessment of opinions expressed in documents on a particular topic.

More in particular, the present invention is related to an opinion analysis system capable of generating opinion intensity ratings of documents expressing an opinion on a subject of interest based on ratings of opinion expressing sentences and/or words found in the document. The ranking of intensity of the opinion expressed in a particular document on a topic of interest is produced in a continuous scale of values within a range from a value corresponding to a "Very Negative" opinion to a value corresponding to a "Very Positive" opinion thus generating an efficient and competent analysis of attitudes, opinions and sentiments expressed in documents with regard to a specific topic during a time span that a user can specify.

The present invention is further directed to a method and system for multilingual opinion analysis for gauging the intensity of opinion expressed in a set of documents in a wide variety of languages.

In overall concept the present invention is related to highly generalized, flexible system and method which produces both quantitative and qualitative scoring of opinions expressed in documents on a particular subject in a multi-lingual domain, and which are easily adaptable to any opinion analysis and scoring technique. The architecture of the present invention is capable of using a particular scoring technique as well as of merging together multiple opinion scoring techniques to generate a comprehensive and accurate opinion intensity analysis.

The present invention is further directed to multilingual opinion analysis architecture outputting a multi-dimensional visual representation of intensity of opinions versus timeline, and/or language, and/or country, etc. on a given topic discussed in multiplicity of documents available from a wide number of data sources in a multi-lingual domain.

BACKGROUND OF THE INVENTION

There are numerous applications where the ability to understand opinions expressed in documents is critical. For example, political campaigns may wish to understand public sentiment about a romantic affair by a candidate running for office, or entities may wish to assess the degree of harshness of news articles about them in the news media. Likewise, Government agencies may wish to gauge the strength of public sentiment about topics of national importance. The ability to gauge opinion on a given topic is therefore of a vital interest.

There are numerous techniques developed to analyze opinions. For example, polling agencies canvas people for opinions. Although providing a sufficient assessment of opinions, opinion polling is an extremely expensive approach.

An alternative to the polling technique is studying of opinions expressed in various kinds of document collections, such as for example movie reviews described in Franco Salvetti, et al., "Automatic Opinion Polarity Classification of Movie Reviews", Colorado Research in Linguistics, June 2004, Volume 17, Issue 1, Boulder: University of Colorado, pp. 1-15. Unfortunately, the opinion analysis described in Salvetti, et al. produces exclusively a binary score, e.g., on "recommend"/"don't recommend" binary scale. In the case of movie opinion genre this scoring approach may be sufficient.

However, in many other cases such binary scoring is not an adequate approach for opinion analysis. Strength of opinion, rather than "yes/no" binary score, is a more desirable outcome of any opinion analysis technique. For example, a CEO of a major corporation may wish to track the intensity of opinion expressed about the corporation in news wires during times of criticality. The strength of opinion would be needed in such cases. It is clear that for many cases, a mere "yes/no" binary score technique may be insufficient.

Unfortunately, most of the currently available opinion analysis systems are based on a binary score approach. In addition to Salvetti, et al., referred to in the previous paragraphs, Peter D. Turney, "Thumbs Up or Thumbs Down? Semantic Orientation Applied to Unsupervised Classification of Reviews", Proceedings of the 40$^{th}$ Annual Meeting of the Association for Computational Linguistic (ACL), Philadelphia, July 2002, pp. 417-424, describes an algorithm developed for classifying a document as "positive" or "negative".

Turney's algorithm is built for reviews, such as movie reviews and car reviews, where the rankings "recommended" or "not recommended" appears to suffice. The system defines adjectives in terms of each other, finds opposites and synonyms depending on the conjunctions used when the adjectives are applied to the same noun, and uses subjective human ratings to test the accuracy of the method.

Another system, described in Bo Pang, et al., "Thumbs Up? Sentiment Classification Using Machine Learning Techniques", Proceedings of the 2002 Conference on Empirical Methods in Natural Language Processing (EMNLP) 2002, pp. 79-86, performs an opinion analysis based on classifying reviews as "positive" or "negative", experimenting with "Naive Bayes", maximum entropy, and support vector machines based algorithms. Again, the technique proposed in Pang, et al. is more directed to finding a polar relationship rather than ranking an adjective (or document's) intensity across a continuum of values.

Another opinion analysis system presented in V. Hatzivassiloglou, et al., "Predicting the Semantic Orientation of Adjectives", Proceedings of the 35$^{th}$ Annual Meeting of the Association for Computational Linguistic, 1997, pp. 174-181, is based on the semantic orientation ("positive" or "negative") of adjectives. Similar to Salvetti, et al., Pang, et al., and Turney, the words are scored on 2-polar scale, thus lacking the intensity based ranking of the opinion related words.

Binary scoring is not always sufficient to accomplish the goals, and a more comprehensive and accurate opinion analysis approach capable of calculating opinion strength ranking is desirable in many situations.

An attempt to assign a degree of intensity to an opinion expressed in a document on a topic of interest is presented in T. Wilson, et al., "Just How Mad Are You? Finding Strong and Weak Opinion Clauses", Proceeding AAAI-04. This is a learning based method for classifying opinion based on identifying and leveraging a set of clues and some novel syntactic features specifically developed for this purpose. Although this is a more advanced system than the binary ranking opinion analysis techniques, Wilson's approach, however, lacks the ability of computing opinion intensity on a continuous numerical scale, since only 4-5 qualitative definitions of opinion strength are assumed, e.g., "neutral", "low", "medium", "high", and "extremely high".

Further, Wilson's approach is heavily dependent on human annotators involvement, which analyze and rank sentences "manually" in detail. This annotation phase is very time consuming and expensive.

Additionally, Wilson's system, although scoring sentences found in documents, does not explicitly describe computations of the opinion score for the entire document based on the scored sentences.

As is readily known to those skilled in the art, the currently available opinion analysis approaches are each somewhat limited to a specific scoring technique and are not adaptable to alternative ones, thus lacking flexibility and generality desirable in the analysis of documents extracted from data sources from a wide spectrum of the media.

Therefore, a comprehensive opinion analysis system is needed which is capable of automatically computing intensity of opinion expressed in a document on a particular topic on a continuous numerical scale in a time and labor efficient manner and which is flexible enough to be easily adaptable to any opinion scoring technique or to be capable to "plug-in" a plurality of such techniques.

Each of the prior opinion analysis techniques is capable of analyzing opinion in only one language at a time. Such an approach is somewhat deficient since it lacks a desirable flexibility to operate efficiently in a multi-lingual domain. For opinion analysis systems, it appears to be important to be able to simultaneously deal with opinions expressed in multiple languages. For example, multinational corporations sell products in numerous countries around the world, each of which has newspapers in their particular national language(s), blogs expressed in the national language(s), etc. Such a multinational corporation would be interested in obtaining a competent and sufficient opinion analysis on its products. If an opinion analysis system has to be reengineered for each and every language, the costs of creating an opinion analysis as well as the time involved in reengineering and developing of a new opinion analysis system for each new language may be unacceptably high.

It is therefore extremely desirable to have an opinion analysis system capable of simultaneous operation in multi-lingual domains without reengineering the system for each language.

SUMMARY OF THE INVENTION

It is an object of the present invention to provide an opinion analysis system capable of generating a comprehensive analysis of opinions expressed on a particular topic in a set of specified documents in a multi-lingual domain.

It is another object of the present invention to provide a system capable of outputting accurate, quantitative and qualitative analysis of opinions expressed on a particular topic in a document which is based on architecture adaptable to a wide range of opinion scoring algorithms.

It is a further object of the present invention to provide an opinion analysis system capable of outputting an accurate opinion analysis in the form of opinion intensities expressed numerically on a continuous scale or expressed qualitatively.

It is a further object of the present invention to provide an efficient opinion analysis system adaptable to a wide range of opinion analysis techniques for a given language. To be able to analyze documents in a multi-lingual domain, the subject system identifies the language of a document and uses a variety of language translators and a multi-dimensional visualization engine for concurrently identifying and visualizing the intensity of opinions in a specified set of documents when these documents are presented in multiple languages.

A system of the present invention for analysis of an opinion expressed in documents on a particular topic includes a data processing system embedding an opinion analysis module, a specification unit for specifying various data sources of documents, a topic of interest and a time frame. A retrieving unit is operationally coupled to the specification unit to extract relevant documents from the data sources. The documents are supplied to the opinion analysis module for opinion intensity calculation. An opinion intensity representation unit outputs the calculated results in a specified format, possibly as a multi-dimensional graph.

The opinion analysis module has an opinion intensity scoring unit computing an intensity of an opinion expressed in the retrieved documents on the topic of interest. The opinion intensity scoring unit preferably includes a quantitative opinion analysis module for computing opinion intensity on a substantially continuous numerical scale as well as a qualitative opinion analysis module for qualitatively rating the intensity of opinion. The quantitative opinion analysis module may also compute the opinion intensity on a binary scale.

A Scored Opinion Expressing Words Bank is operatively coupled to the opinion analysis module. The Bank contains a multiplicity of pre-evaluated word scoring functions assigning respective scores to predetermined opinion expressing words and phrases.

The opinion intensity scoring unit may include a sentence scoring unit. The intensity of an opinion expressed in a document is computed by aggregating opinion intensity scores of relevant sentences found in the document under study. Additionally, the sentences scoring unit may include a words scoring unit assigning opinion intensity scores to opinion expressing words and synonyms thereof found in relevant sentences.

The opinion intensity scoring unit further includes a hybrid evaluation module assigning scores to the opinion intensity of each document by using a plurality of merged opinion intensity scoring techniques.

In another aspect, the present system is designed for analysis of an opinion expressed in documents on a particular topic in a multi-lingual domain. The multi-lingual opinion analysis system is a data processing system which includes a data retrieving unit retrieving documents relevant to a topic of interest from a plurality of data sources of documents in the multi-lingual domain. A translation module is operatively coupled to the data retrieving unit to receive the retrieved documents. The translation module contains a language identifying unit identifying a language used in each retrieved document received at the translation module.

The opinion analysis module is operatively coupled to the translation module to compute intensity of opinions on the topic of interest expressed in documents received from the translation module. The opinion analysis module includes an opinion intensity scoring unit for scoring an intensity of an opinion expressed in documents on the topic of interest on a substantially continuous as well as a binary numerical scale. The opinion analysis module rates the documents also qualitatively.

The opinion analysis module includes an opinion analysis unit adapted to at least one language. If the language declared in the language identifying unit of the translation module corresponds to the respective language, the translation module outputs the document to the opinion analysis module for analysis therein.

If, however, the identified language differs from the respective language, the translation module applies an appropriate translator to the document to translate the identified language into the respective language and outputs the translated document to the opinion analysis module for further analysis.

The system uses a multi-dimensional visualization engine to output the computed opinion intensity. The visualization engine is operatively coupled to the opinion analysis module to output the calculated opinion intensity in a multi-dimensional format agreeable with a multi-lingual domain of the retrieved documents. Any method for visualizing multiple time series data may be utilized.

The multi-lingual opinion analysis system further includes an opinion database unit coupled to the opinion analysis module and the multi-dimensional visualization engine. The opinion database unit is a database containing identification information of each retrieved document, topic extracted from each retrieved document, relevant metadata, and opinion scores of each retrieved document. An opinion cache unit is operatively coupled to the opinion database unit and the multi-dimensional visualization engine. The opinion cache unit is a high-speed in-memory server which has precomputed statistical data contained therein.

Present method for analysis of an opinion expressed in documents on a particular topic of interest includes the steps of:
- specifying sources of documents, topic of interest, and a time period of interest for a data processing system including an opinion analysis module adapted for analyzing documents in at least one respective language,
- retrieving a set of documents "D" on the topic of interest for the specified time period from the sources of documents,
- identifying a language of each document "d" of said retrieved set of documents "D",
- entering each document "d" into the opinion analysis module if the identified language of the document "d" corresponds to the respective language,
- otherwise, translating the document "d" from the identified language into said at least one respective language and sending the translated document "d" to the opinion analysis module,
- computing an intensity of an opinion expressed in each document "d" on the topic of interest in the opinion analysis module, and
- outputting the computed intensity of an opinion in a multi-dimensional format.

The intensity of opinion is computed on a substantially continuous numerical scale, and/or on a binary numerical scale, and/or qualitatively.

Prior to computing the intensity of an opinion, a Scored Opinion Expressing Words Bank is formed (this step is done once and does not need to be performed when a user poses a query) containing precalculated word scoring functions assigning respective scores to predetermined opinion expressing words and phrases.

The word scoring functions are pre-computed by the steps of:
- selecting a collection "$D_{test}$" of training documents,
- scoring opinion intensity of each document in the collection "$D_{test}$" by a number of individuals,
- forming a multiset of the opinion intensities scored by individuals for each document from the collection "$D_{test}$", and
- scoring opinion expressing words by predetermined algorithms.

The computation of the intensity of the opinion expressed in each document "d" on the topic of interest includes the steps of:
- extracting a set of relevant sentences from each document "d",
- finding opinion expressing words ω and synonyms ω' in each of a relevant sentence "s",
- extracting a corresponding score from the Scored Opinion Expressing Words Bank for each ω and ω',
- adding the extracted scores for all ω and ω' in each relevant sentence "s", and
- averaging the added score of all relevant sentences "s" in each document "d".

Alternatively, the computation of the intensity of the opinion expressed in each document "d" on the topic of interest includes the steps of:
- assigning "initial" score sc(s) and sc($s_n$) to each sentence "s" and "$s_n$" expressing opinion and "not" expressing an opinion, respectively, on the topic of interest,
- splitting the scored sentences "s" and "$s_n$",
- for each s and each "$s_n$", finding the distance between them the document "d",
- for each "s", calculating an impact of all "$s_n$" thereon, and
- averaging all sc(s) and impacts of all sc($s_n$).

In another alternative implementation, the computation of the intensity of the opinion expressed in each document "d" on the topic of interest includes the steps of:
- establishing a list of lexographic templates,
- applying the lexographic templates to the sentences in each document "d",
- extracting relevant sentences in each document matching at least one of the lexographic templates, and
- scoring the relevant sentences.

In another alternative implementation, the computation of the intensity of the opinion expressed in each document "d" on the topic of interest is performed by a hybrid evaluation method which comprises the steps of:
- specifying a document collection "D",
- specifying a document collection "$D_{test}$",
- associating with each document dϵD, a first scoring vector corresponding to a plurality of scoring techniques,
- scoring each document dϵD in correspondence with the first scoring vector,
- associating with each document $d_t \epsilon D_{test}$, a second scoring vector corresponding to a plurality of scoring techniques,
- scoring each document $d_t \epsilon D_{test}$ in correspondence with the second scoring vector,
- scoring each document $d_t \epsilon D_{test}$ by individuals,
- for each scored dϵD, finding r-nearest neighboring documents $d_i$(i=1, ..., r) scored by the second scoring vector,
- finding scores assigned by individuals to the documents $d_i$(i=1, ..., r), and
- averaging the scores assigned to the documents $d_i$(i=1, ..., r) by individuals.

The qualitative computation of the intensity of opinion includes the steps of:
- specifying a document collection "$D_{test}$",
- establishing a rating scale including a list of words positioned in a predetermined order of positiveness of an opinion, defining threshold ranges for each word on the rating scale by applying scoring of documents in the document collection "$D_{test}$" by individuals, scoring each document "d" quantitatively, and assigning a qualitative rate to each document "d" in accordance with the identified threshold ranges.

In the present method, the identification of the language used in each document "d" includes the steps of:

retrieving a collection "D" of documents "d", specifying list of countries, for each country, specifying a list of languages $A_i$, extracting "n" random words from "n" random documents from the documents collection "D", applying a translator "$A_i \rightarrow$English" to the "n" random words, calculating a number $N_i$ of words translated from the language $A_i$ into English, if the $N_i$ exceeds a predetermined threshold percentage, declaring the language $A_i$ for said documents D.

These and other features and advantages of the present invention will become apparent after reading a further description of the preferred embodiment in conjunction with the Patent Drawings.

DESCRIPTION OF THE PREFERRED EMBODIMENTS

Figure 1:
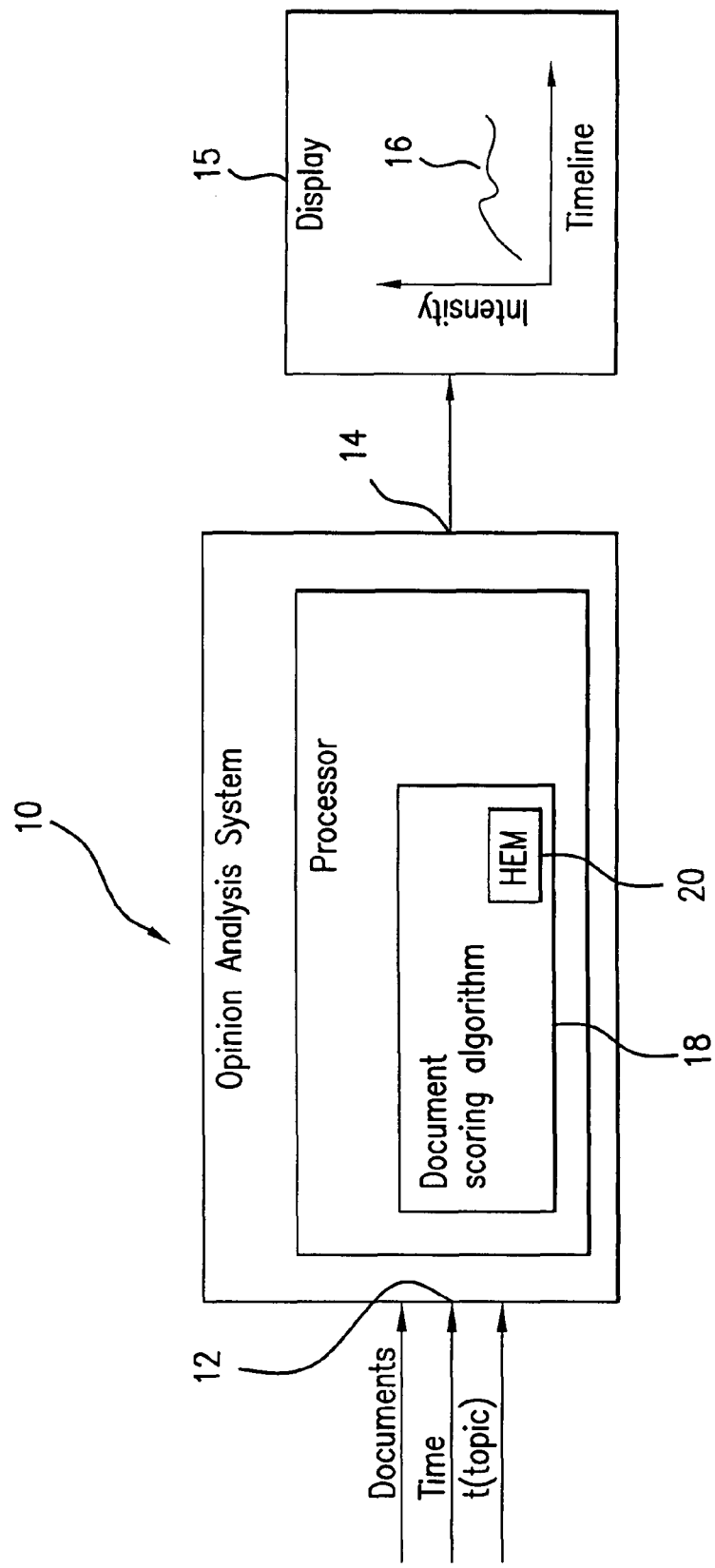
FIG. 1 is a schematic representation (in block form) of the opinion analysis system of the present invention.

Referring to FIG. 1, an opinion analysis system 10 of the present concept is based on data processing architecture which includes a set of algorithms and a software platform and which receives at an input 12 a set D of documents d∈D as well as a topic t of interest. The documents D include any text data available from websites, blogs, news groups and virtually any data available for processing. A time period of interest is also entered in the system 10.

The present opinion analysis system studies the documents D, gauges the degree of opinion intensity expressed about the topic t in the set of documents D, and generates a result, in quantitative and/or qualitative form which is output at an output 14 of the present system 10, for example, on a display 15. A display unit 15 may be included in the system 10 for the purpose of representing the output information in a visual form. The result may be output in any format, such as for example a graph 16 where one axis reflects the intensity of opinion on the topic t expressed in the documents selected for this purpose. Another axis may represent a timeline to track the change of the opinion intensity over a specific timeframe. Alternatively, the resulting graph 16 may be in three- or four-dimensional form in order to represent how the opinion varies not only over time, but also from country to country in different sources of documents, etc.

The present opinion analysis system 10 may serve its function in a single language domain. However, it is also capable of an opinion analysis in a multi-lingual domain, e.g., for any number of languages simultaneously without the need to reengineer the system for each additional language of interest as is described herein in further paragraphs in conjunction with FIGS. 15-17.

The present system is developed with the capability to use a wide range of opinion scoring algorithms 18 and is capable of embedding various scoring functions, both known in the art as well as newly developed and presented in the subject Application. The opinion analysis system 10 is not limited to a binary scoring of the opinion on a particular topic expressed in a set of documents which may be an insufficient evaluation in many cases. The present system has a capability of a quantitative ranking of opinions on a continuous numeric scale. The intensity of opinions is computed based on a continuum of rating values for words (adjectives as well as non-adjectives), sentences, as well as entire documents.

The present system provides a continuum of quantitative ratings for opinion intensity from a value corresponding to a "very negative" opinion to a value corresponding to a "very positive" opinion. For example, the system may use the score "0" as a "very negative" rating, and a score "1" to rate a "very positive" opinion. These particular scale values are used herein as an example only. The present system may be easily recalibrated for other scales, and other scale values for rating "maximally negative/harsh", as well as "maximally positive" opinions, are also contemplated in the present system and method. In addition to providing the continuum of quantitative ratings for opinion intensity, the present system is capable of polar (binary) scoring, as well as of grading the opinions on a qualitative basis, e.g., represented for example as "very positive", "positive", "neutral", "negative", and "very negative". Being capable of generating both quantitative and qualitative scoring of the opinions expressed in documents on a particular topic, the system of the present concept provides for a highly comprehensive opinion analysis.

Additionally, the present opinion analysis architecture is not limited to a single scoring technique, but has the advantage of using a broad range of algorithms for opinion analysis, each of which may be "plugged in" without any reengineering of the system 10.

The system may also use a hybrid scoring method (HEM) algorithm 20 that integrates the results of multiple scoring procedures. The ability to merge scoring techniques has been found to be beneficial in generating a highly accurate scoring of the strength of an opinion presented in the document with respect to a specific topic.

Figure 2:
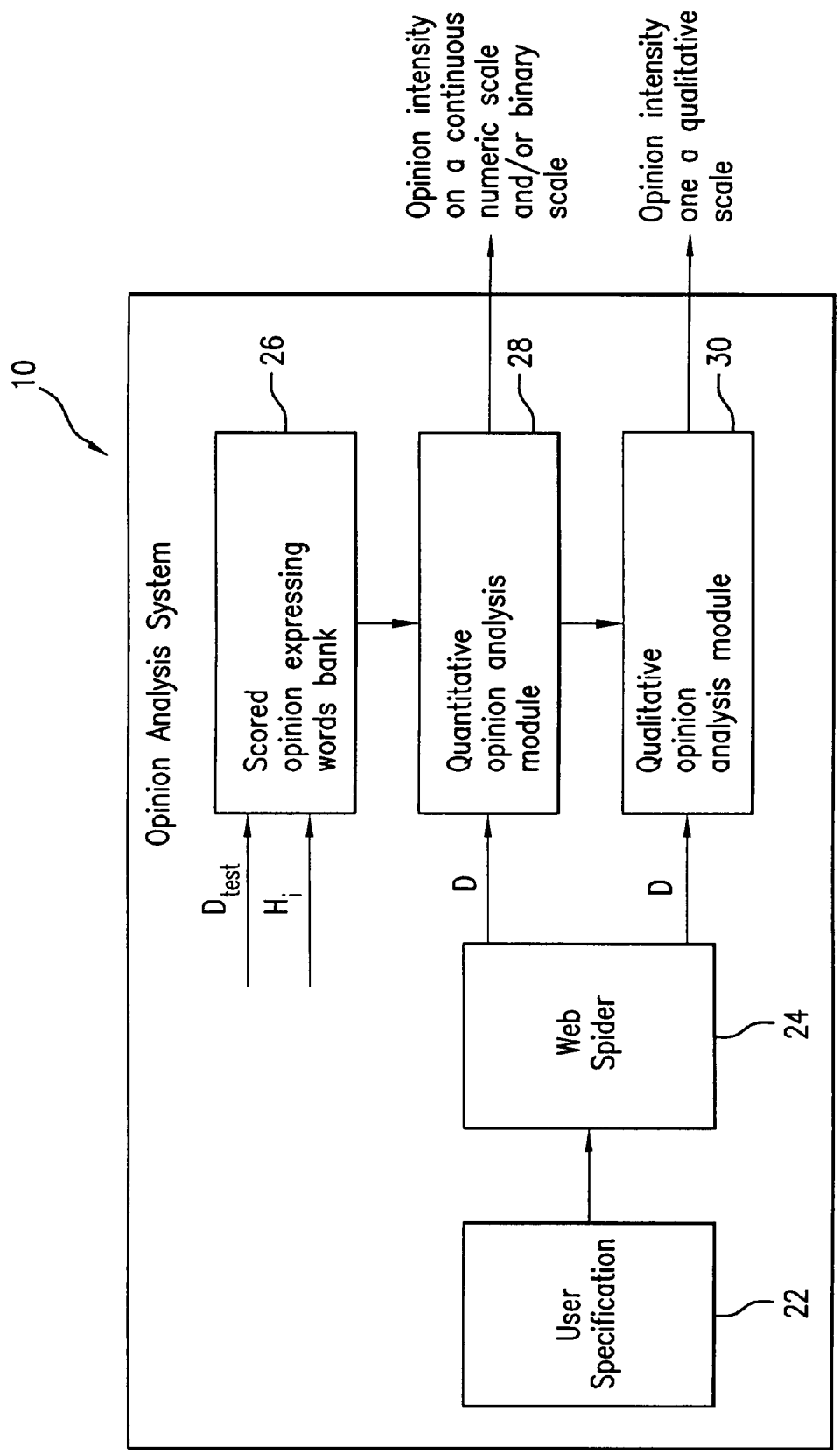
FIG. 2 is a block diagram of the opinion analysis system of the present invention.

Referring to FIG. 2, the present opinion analysis system 10 includes a User Specification block 22 where the user specifies, through any available interface, a set of sources of documents, e.g., websites, directories, domain names, URLs, etc., a topic t of interest, and a time interval of interest. Uniform resource locator (URL) provides for the global address of documents and other resources on the World Wide Web.

The information specified by a user in the User Specification block 22, is supplied to a Web Spider unit 24 which retrieves all documents found in the specified directories or the specified addresses that are relevant to the topic t and that were authored/updated during the time frame of interest. Web Spider unit 24 outputs a set D of documents of interest for further processing and analysis. Numerous algorithms may be used to find documents about a given topic t, including for example Latent Semantic Analysis which is a statistical language understanding technique that estimates similarities on a scale from 0.1 to 1 between the latent semantic structure of terms and texts as described in Deerwester, et al., 1990 "Indexing By Latent Semantic Analysis", Journal of the American Society for Information, pp. 391-407, 1990.

The system 10 further includes a Scored Opinion Expressing Words Bank unit 26 which is a "depository" of a multiplicity of word scoring functions. In the unit 26, words and phrases which directly or indirectly express an opinion, are assigned a specific score.

The system 10 further includes a Quantitative Opinion Analysis Module 28 and a Qualitative Opinion Analysis Module 30 in which a document d from the set D provided from the Web Spider unit 24 is analyzed to assess the harshness of the document d with regard to the topic t. The Quantitative Opinion Analysis Module 28 uses a set of quantitative models to compute the scores of an opinion intensity expressed in a document on a given topic on a continuous numeric scale, and/or on a binary scale. The Qualitative Opinion Analysis Module 30 classifies documents according to qualitative ratings and generates opinion intensity expressed in a document on a topic of interest on a predefined qualitative rating scale as will be presented in further detail in subsequent paragraphs.

Figure 3:
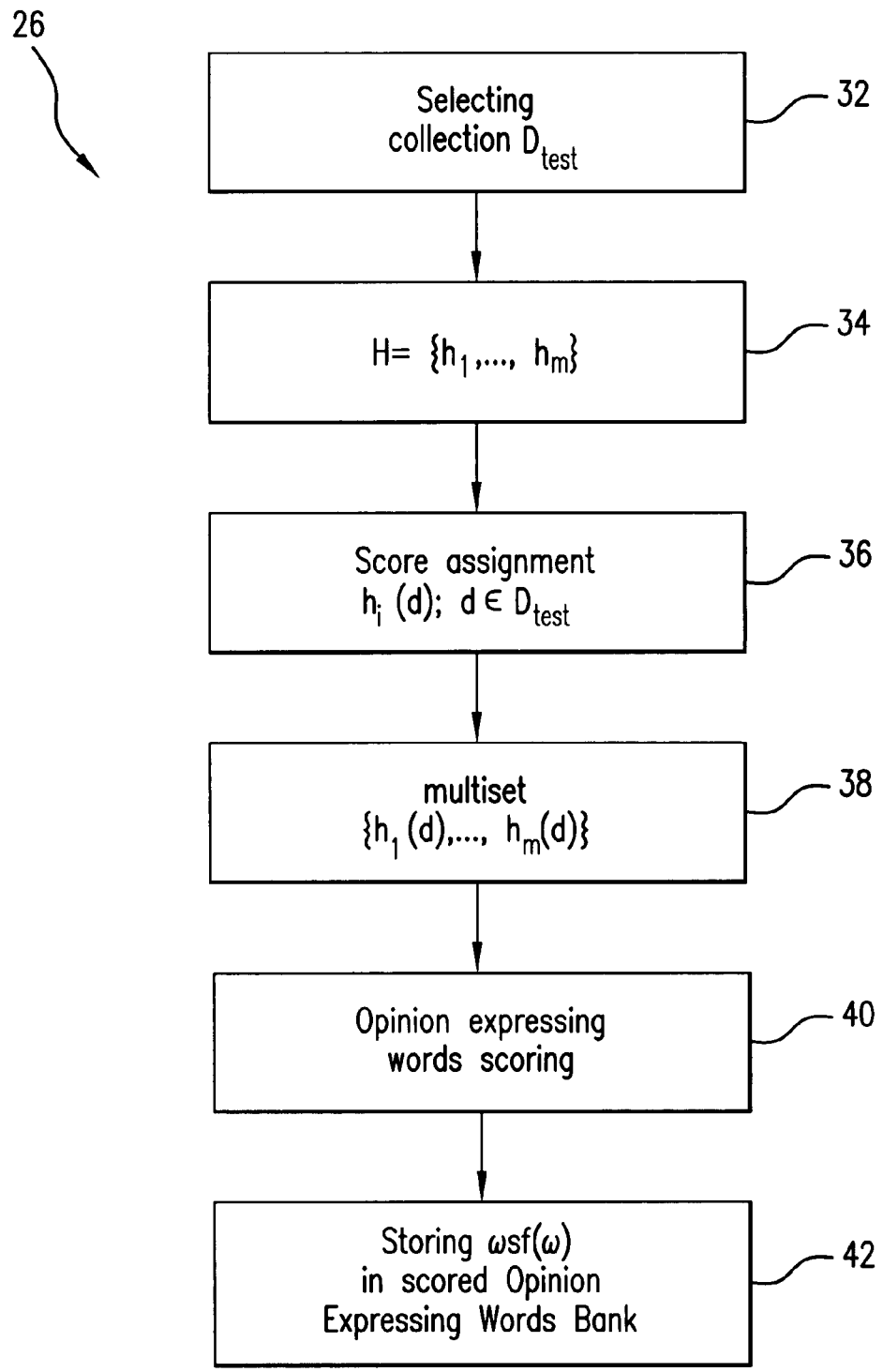
FIG. 3 is a flow chart diagram representing a process of creation of the Scored Opinion Expressing Words Bank.

Referring to FIG. 3, the Scored Opinion Expressing Words Bank unit 26 is created based on the scores assigned to a set of test documents $D_{test}$ by individuals.

In the Opinion Expressing Words Bank unit 26, words and phrases (e.g. "appalling", "highly desirable", "mistreatment", "inhumane mistreatment etc.) that directly or indirectly express an opinion are assigned a score. For example, the approach may be taken to assign a higher score to a more positive word.

The procedure of creation of the Scored Opinion Expressing Words Bank is initiated in block 32 "Selecting Collection $D_{test}$", in which a predetermined number of randomly selected "training" documents $d \in D_{test}$ are selected by a user. As an example, a collection $D_{test}$ may be formed by selecting 100 randomly selected "training" documents.

The procedure further follows to the block 34 "H= $\{h_1, \ldots, h_m\}$" in which each of a preselected group of individuals evaluates the documents from the collection $D_{test}$.

An example document d is used which may include the following paragraph containing words of opinion interest:

Example 1

"As news of the disgraceful mistreatment of prisoners sweeps the world, our enemies celebrate a major propaganda gift. Even our friends cannot defend the indefensible."

From block 34, the logic follows to the block 36 "Score Assignment "$h_i(d); d \in D_{test}$". In block 36, each individual $h_i$ assigns a harshness score from "0" to "1" to each document d. Each document may be read by a number of annotators, each of whom gives the document a harshness score, for example, from 0 to 1, where a low score is for a "very harsh" document, while a high score is for a "very positive" document.

The procedure further continues to the block 38 "Multiset $\{h_i(d), \ldots h_m(d)\}$, where a multiset of the scores assigned by all of the individuals $h_i$ to a document d under study is formed.

Based on the wording of the document the procedure further scores the opinion expressing words and phrases found in the document d under study. For the opinion expressing word scoring, the logic flows to block 40 where the word scoring is performed in several alternative manners including, but not limited to Pseudo-Expected Value Word Scoring technique presented in FIG. 4, Pseudo-Standard Deviation Adjective Scoring technique presented in FIG. 5, or some other word scoring technique as will be described in further paragraphs. The word scoring techniques used in the present system are also applicable to phrase scoring. For example, it is possible to score strings in the text under study irrespective of whether they are words or phrases. Alternatively, the phrases may be scored in a different manner than the words.

The system uses an extensive library of opinion expressing word scoring methods that can be expanded. It is possible to restrict the Scored Opinion Expressing Words Bank to specific types of words and phrases rather than to use all types of the words and phrases to be stored in the Scored Opinion Expressing Word Bank.

Upon accomplishing the operation of opinion expressing words scoring in block 40, the logic flows to block 42 "Storing $\omega sf(\omega)$ in Scored Opinion Expressing Words Bank" to store in the memory of the unit 26, word scoring functions $\omega sf(\omega)$ assigning scores to words (and phrases) directly or indirectly expressing an opinion. A word scoring function $\omega sf$ is any mapping from the set of all opinion expressing words to the unit interval [0, 1]. There are infinitely many wsf's. The task is to find a few good ones. In addition, it may be desirable to restrict the set of words to which a score is assigned (e.g. to adjectives alone). This restriction is accomplished with great care, since valuable information may be lost. For example, in the Example 1 quote, words like "mistreatment" and "propaganda" that have a negative connotation would be missed out if the restriction is focused on adjectives alone.

Figure 4:
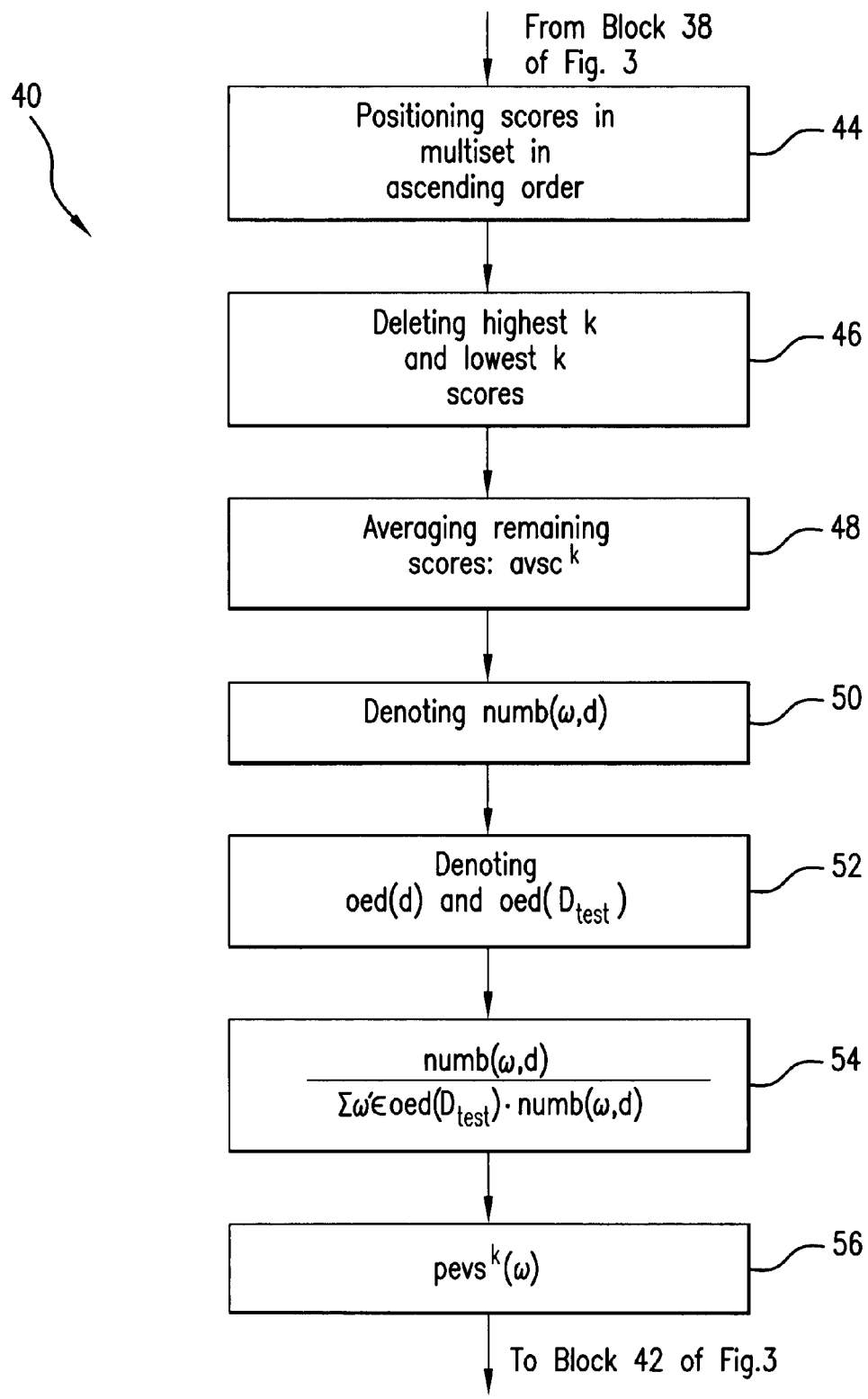
FIG. 4 is a flow chart diagram of the process of Pseudo-Expected Value Word scoring.

Referring to FIG. 4, describing a Pseudo-Expected Value Words scoring procedure, the routine starts at block 44 "Positioning Scores in Multiset in Ascending (or descending) order" in which the logic positions the scores $h_i(d)$ from the multiset created in block 38 of FIG. 3 in a specified order, such as for example, ascending, or alternatively descending, order. For instance, supposing 10 individuals (annotators) read a given document and assigned scores 0.8, 0.7, 0.2, 1, 0.75, 0.6, 0.9, 0.8, 0.6, 0.7 to the document. This set of scores is positioned in an ascending order in block 44, to include 0.2, 0.6, 0.6, 0.7, 0.7, 0.75, 0.8, 0.8, 0.9, 1.

Further, the logic proceeds from the block 44 to block 46 "Deleting highest k and lowest k scores" where the k top scores and the k bottom scores are deleted from the multiset positioned in the ascending or descending order in block 44. If k=2, the two lowest and the two highest numbers in this sorted list are eliminated in block 46 to obtain 0.6, 0.7, 0.7, 0.75, 0.8, 0.8. In the assigned scores in the example discussed, one person assigned a very low score (0.2) which seems to be far removed with respect to all other scores. Care is taken in the selection of k, as it is desirable to maintain a reasonable selection of scores to average.

Further, from block 46 the logic passes to block 48 "Averaging remaining scores: avsc$^k$" in which the procedure averages the scores remaining after deleting the highest and lowest scores in block 46.

$$pevs^k(\omega) = \frac{\sum d \in D_{test}\left(avsc^k(d) \cdot \frac{numb(\omega, d)}{\sum \omega' \in oed(D_{test}) \cdot numb(\omega', d)}\right)}{\sum d \in D_{test} \cdot avsc^k(d)} \quad \text{(Eq. 1)}$$

Definition 1: (avsc$^k$(d)).

Assuming $D_{test}$ is a set of test documents, and H={$h_l$, ..., $h_m$} is a set of human annotators, each of whom renders a non-negative score $h_i(d)$ with regard to the document d. Suppose the scores are ordered in the multiset {$h_i(d)$, $h_m(d)$} in ascending order and the top k scores and the bottom k scores are deleted. The notation avsc$^k$(d) is then used to denote the average of the remaining scores. The average of the scores assigned in the Example is 0.725, as calculated in block 48.

From the bock 48 the procedure flows to block 50 "Denoting numb ($\omega$, d)" in which the number of occurrences of either word $\omega$ (or its synonym) in document d is calculated.

Definition 2: (numb($\omega$, d)).

The notation numb($\omega$, d) is used to denote the number of occurrences of either $\omega$ or its synonym in a document d.

For instance, if the paragraph in Example 1 is considered as a document $d_0$, the value numb("disgraceful", $d_0$))=1.

Further, the logic continues to block 52 "Denoting oed (d) and oed ($D_{test}$)" where the set of all opinion expressing words $\omega$ (and their synonyms $\omega'$) occurring in the document d and $D_{test}$, respectively are denoted.

Definition 3:

Given any document d and any collection D of documents, the notations oew(d) and oew($D_{test}$) are used to respectively denote the set of all opinion-expressing words (and their synonyms) occurring in document d and $D_{test}$.

If it is desired to restrict the interest to adjectives, a function oew$_{adj}$(d$_0$) may be used which extracts all adjectives occurring in the document. In the case of Example 1, the set of words extracted will include: {disgraceful, indefensible}.

The logic further passes to block 54 to calculate $$\text{"}\frac{numb(\omega, d)}{\sum \omega' \in oed(D_{test}) \cdot numb(\omega', d)}\text{"}$$

which corresponds to the relative proportion of occurrences of an opinion expressing word and its synonyms ($\omega$) compared to the total number occurrences of adjectives ($\omega'$) in $D_{test}$.

It is clear that blocks 50-54 alternatively may be plugged in at any point of the procedure presented in FIG. 3 after block 32 and before block 40. The calculations performed in blocks 50-54 may also alternatively be performed offline when the collection $D_{test}$ is selected.

The expression calculated in block 54 corresponds to a relative proportion of $\omega$ and its synonyms to the total number of adjectives in the document d. Similar to an expected value computation in statistics, if this expression is multiplied by avsc$^k$(d), a measure of the contribution of the score avsc(d) of d contributed by opinion expressing word $\omega$ and its synonyms may be obtained. The score, pevs$^k$($\omega$) of word $\omega$ may be therefore set by averaging the contribution of the score of $\omega$ across all the documents in the test set $D_{test}$.

To find the score of the word $\omega$ (or/and its synonym), the process flows to block 56 "pevs$^k$($\omega$)" in which the score of the word $\omega$ is calculated by averaging the contribution of the score of the word $\omega$ and its synonyms across all the documents in the set $D_{test}$ in accordance with Eq. 1:

Eq. 1 permits the obtaining of a whole family of methods to score opinion expressing words based on the selection of k.

Various modifications of the Pseudo-Expressed Value word scoring may also be used. For example, a case may be considered where instead of counting the total number of occurrences of an opinion expressing word (or its synonyms), only the number of occurrences that occur in either a direct expression of opinion or an indirect one may be counted.

From block 56, the procedure loops to block 42 of FIG. 3 for storing the scored word $\omega$ along with its score in the Scored Opinion Expressing Words Bank 26.

Figure 5:
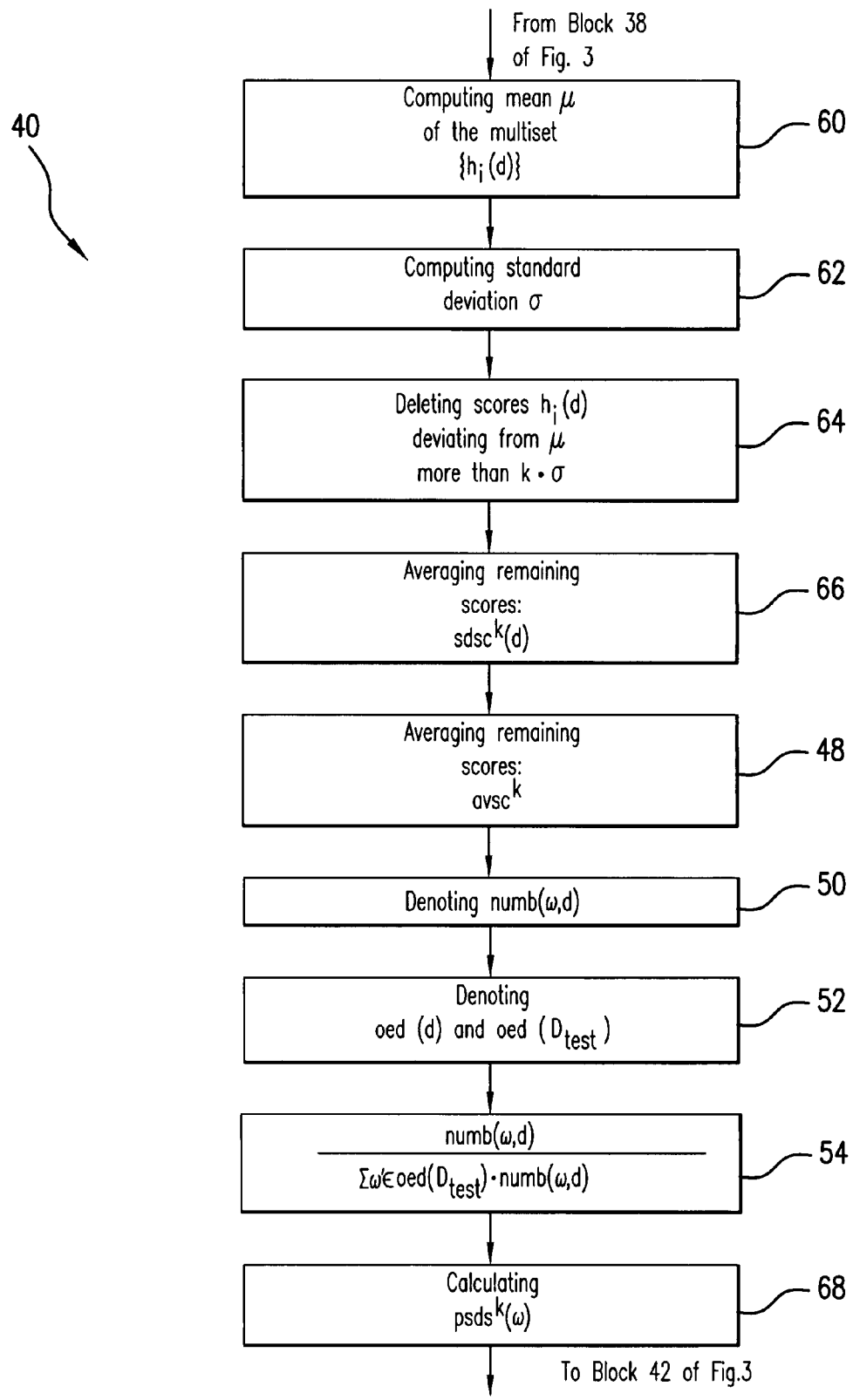
FIG. 5 is a flow chart diagram of the process of Pseudo-Standard Deviation Adjective scoring.

The opinion expressing word scoring of block 40 may be alternatively performed by a Pseudo-Standard Deviation Adjective Scoring technique presented by the flow chart diagram shown in FIG. 5. This alternative strategy considers the scores assigned to each test document on some fixed scale, e.g. 0 to 1 or 1 to 10 by annotators.

Definition 4: (sdsc$^k$(d))

Suppose $D_{test}$ is a set of test documents, and H={$h_l$, ..., $h_m$} is a set of human users, each of whom renders a quantitative score $h_i(d)$ about document d. Let $\mu$ be the mean of all these scores and let $\sigma$ be the standard deviation. Let k$\geq$1 be any integer. sdsc$^k$(d) is set to be the mean of the multiset {$h_i$(d) |abs($h_i$(d)−$\mu$)$\leq$k$\cdot\sigma$}.

When assigning a score to an opinion expressing word using Pseudo-Standard Deviation Scoring, the process starts with evaluating the scores assigned to test documents by individuals. The mean and standard deviation of these scores is computed. All scores that deviate from the mean more than a standard deviation, are not counted. The average of the remaining scores is then calculated. This strategy has the advantage of eliminating outliers, e.g. the scores which extremely deviate from the mean, on a sound statistical basis. For example, it is statistically known that for normal distributions, about 97% of all values in a set lie within three standard deviations of the mean. Therefore k=3 is generally a preferred value.

A score to each opinion expressing word $\omega$ is then assigned in substantially the same way as is done with the Pseudo-Expected Value scoring, as shown in FIG. 4, with the difference that sdsc$^k$ is used instead of avsc$^k$, e.g., the score assigned is given by the Eq. 2:

$$psds^k(\omega) = \frac{\sum d \in D_{test}\left(sdsc^k(d) \times \frac{\text{numb}(\omega, d)}{\sum \omega' \in oe\omega(D_{test}) \cdot \text{numb}(\omega', d)}\right)}{\sum_{d \in D_{test}} sdsc^k(d)}$$ (Eq. 2)

The opinion expressing word scoring procedure shown in FIG. 5 is initiated in block 60 "Computing mean μ of the multiset {$h_i(d)$}" in which the logic calculates the mean of the multiset received from block 38 of FIG. 3. From block 60, the logic flows to block 62 "Computing Standard Deviation σ" in which a measure of how spread the scores in the multiset $h_i(d)$, e.g. the standard deviation, is calculated. As is apparent to those skilled in the art, the standard deviation may be calculated by the following steps:

1. Compute the mean for the dataset;
2. Compute the deviation by subtracting the mean from each value;
3. Square each individual deviation;
4. Add up the squared deviations;
5. Divide by the sample size (assuming sample size>1);
6. Take the square root.

Subsequent to computing mean μ in block 60 and standard deviation σ in block 62, the process continues to block 64 "Deleting scores $h_i(d)$ deviating from μ more than k·σ". This is done to eliminate outliers on a sound statistical basis.

From block 64, the procedure passes to block 66 "Averaging the remaining scores: $sdsc^k(d)$".

The calculations performed in blocks 48-54 of FIG. 4 are performed in similar manner in the routine shown in FIG. 5. The positioning of blocks 48-54 may be alternated to be placed at any point of the flow chart shown in FIG. 3 between blocks 32 and 40. Alternatively, the calculations made in blocks 48-54 may also be carried out offline.

Upon finishing calculation in blocks 48-54, the procedure passes to block 68 "$psds^k(\omega)$" where the score is assigned by the formula in Eq. 2. From block 68, the calculated Pseudo-Standard Deviation Adjective score is supplied to block 42 of FIG. 3.

Upon formation of the Scored Opinion Expressing Words Bank 26 created either by the Pseudo-Expected Value scoring method or the Pseudo-Standard Deviation scoring method, or any other appropriate scoring method, the next step is to score an entire document d in some collection D of documents (which may be different from $D_{test}$).

The present opinion analysis system 10 provides both quantitative and qualitative scoring techniques for scoring documents in a selected collection of the documents.

Several Quantitative Opinion Analysis algorithms have been developed that take each document d∈D and assess the "harshness" of d with regard to the topic t. The Scored Opinion Expressing Words Bank 26 is used in deriving a quantitative score for the document. Three families of algorithms have been developed to assign a score to the opinions expressed about a given topic t in a given document d. In addition, a Hybrid Evaluation algorithm has been devised that takes the scores returned by any algorithm, developed either by the Applicants or others and merge them. The time taken by these algorithms, and the accuracy of these algorithms in gauging opinions depend not only on the algorithms themselves, but also the methods used to score words.

A qualitative score is derived from the quantitative score by assigning various ranges of qualitative scores (e.g. "positive", "harsh", "very harsh", and so on) to a word, for example, an adjective. The system 10 automatically learns such ranges.

The system 10 can also lay out the scores for documents on a spatio-temporal basis (e.g. show how opinions about a particular topic change with time in a certain country vs. another country). The scoring of the document is performed in the Quantitative Opinion Analysis module 28 and the Qualitative Opinion Analysis module 30 shown in FIG. 2.

The quantitative opinion analysis module 28 may include one or several of the following algorithms for scoring documents: Topic Focused ($TF^{\omega sf}$) algorithm, Distance Weighted Topic Focused ($DWTF^{\omega sf}$) algorithm, Template Based ($TB^{\omega sf}$) algorithm, Hybrid Evaluation Method (HEM), among others.

Figure 6:
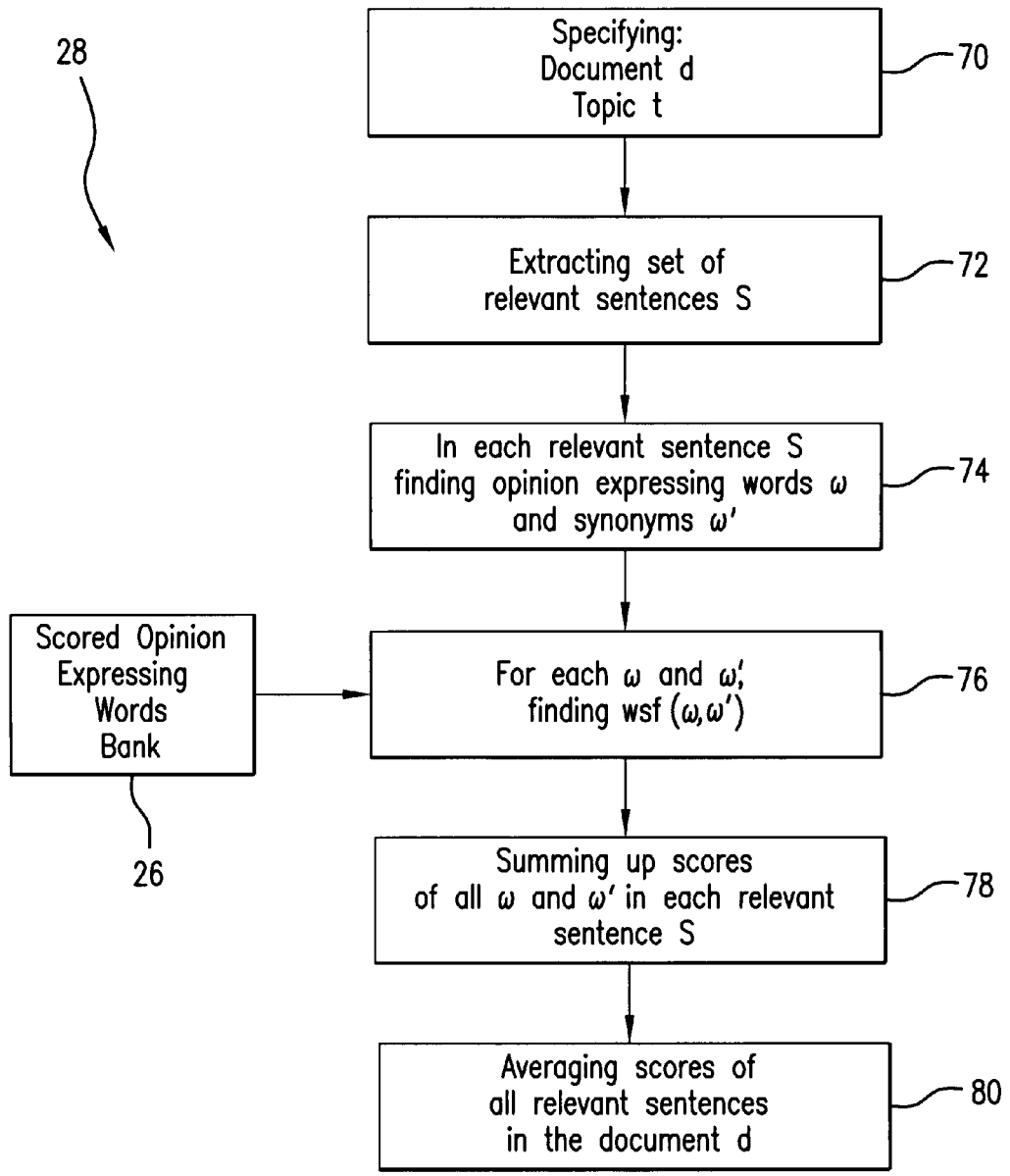
FIG. 6 is a flow chart diagram of the process for Topic-Focused scoring of documents.

The flow chart diagram of the Topic Focused algorithm is presented in FIG. 6. The Topic-Focused ($TB^{\omega sf}$) algorithm finds all sentences involving either a direct or indirect expression of opinion about the topic t of interest. It then assigns a score ωsf(s) to each sentence s by summing up the scores (using ωsf(s)) of all opinion-expressing words ω occurring in s. It then returns the average sentence score of all such sentences. The algorithm returns different answers based on the selected word scoring method.

The Topic-Focused Algorithm may be implemented for example by the following software program:

```
:function TF^wsf (d, t extractRelSent)
    d is a document
    t is the topic of interest
begin
    Result←0//no result so far
    NSentences←0//no sentences processed so far
    NWDS←0//no words processed so far
    Sentences←extractRelSent(d,t)//find relevant set of sentences in d
    foreach a ∈ Sentences Do
        NSentences←NSentences+1
        OEW←findOEW(s)//find multiset of OEWs in s foreach w
        ∈ OEW do
            Syn←findsyn(w)//Synonyms is the set of synonyms
            of w foreach w¹ ∈ Syn do
                If w¹ ∈ SWB then
                    NOEW←NOEW + 1
                    Result←wsf(w¹)+Result
                end if
            end foreach
        end foreach
    end foreach
    If (NSentences > 0) then
        Result←Result/NSentences
    else
        Result←0
    end if
    return Result
end
```

The Topic—Focused algorithm, as shown in FIG. 6 is initiated in block 70 "Specifying: Document d, topic t". The logic flows to block 72 "Extracting set of relevant sentences s" containing direct or indirect opinion expression on topic t of interest in which logic "counts" the text in the document d and extracts, one after another, sentences containing an opinion on the topic t.

Upon finding the relevant set of sentences s, the logic follows to block 74 "In each relevant sentence s, finding all opinion expressing words ω and synonyms ω'". The logic further visits the Scored Opinion Expressing Words Bank 26 from which, for each ω and ω', a word scoring function ωsf(ω, ω') is extracted. The system sums up the scores ωsf(ω, ω') of all opinion expressing words and their synonyms in each sentence s in block 78, thereby assigning a score ωsf(s) to each sentence s. Upon accomplishing the function of block 78, the logic passes to block 80 "Averaging the scores ωsf(s) for all relevant sentences in the document d".

Figure 7:
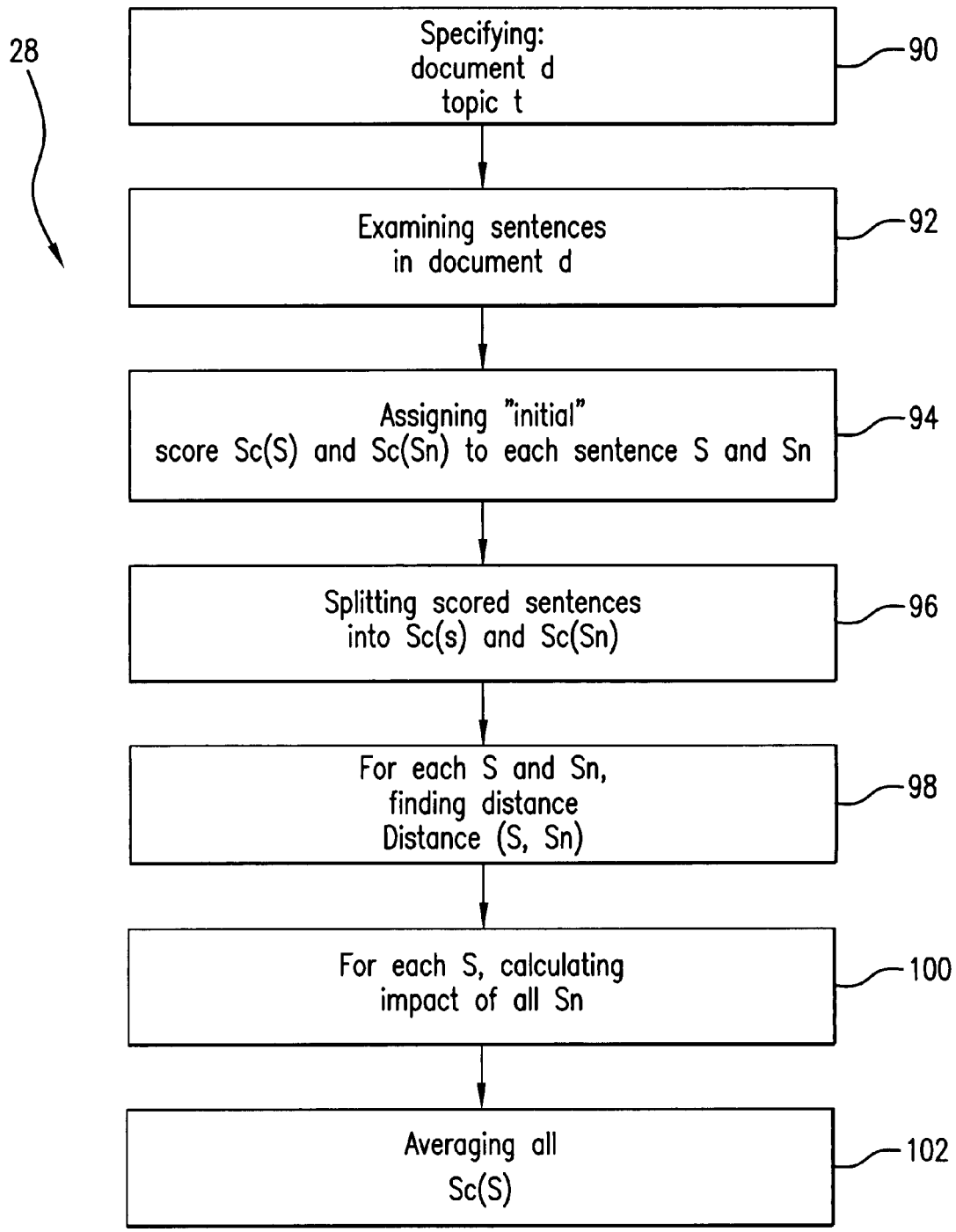
FIG. 7 is a flow chart diagram of the process for Distance Weighted Topic Focused scoring of documents.

Alternatively, the documents may be scored by a Distance Weighted Topic Focused (DWTF$^{\omega sf}$) algorithm presented by the flow chart diagram in FIG. 7.

The Distance-Weighted Topic Focused (DWTF$^{\omega sf}$) algorithm examines all sentences in the document and assigns an "initial" score to them (for example, by finding the average scores of the adjectives in the sentence or by taking the sum of the scores of the adjectives in the sentence). In fact, any method, sc, to score a sentence may be plugged into the system 10. For example, the TF$^{\omega sf}$ may be applied to a document containing just one sentence.

The Quantitative Opinion Analysis Module 28 then splits the document into those that express (either directly or indirectly) an opinion about the topic t or interest (this set is denoted by OpinionS), and those sentences in the document that do not express an opinion about t (denoted by NotOpinionS).

For each sentence s that expresses an opinion about t and each sentence $s_n$ that does not, the module 28 finds the distance between the sentences and then multiplies this distance by a constant $\beta \geq 1$ that may be selected in a predetermined manner. The score of sentence $s_n$ further is multiplied by $e^{-\beta \cdot Distance(s,s_n)}$ to modulate the impact of $s_n$ on s. Instead of using $e^{-\beta \cdot Distance(s,s_n)}$, any similar function may be used, for example, $2^{-\beta \cdot Distance(s,s_n)}$. In other words, if "harsh" adjectives are used in a sentence $s_n$ that does not express an opinion about t, and $s_n$ is in proximity to s, then the impact is large.

The DWTF Algorithm may be implemented for example by the following software program:

```
function DWTF(d,t,β,sc)
    d is a document
    t, topic of interest
    Result←0
    OpinionS←GETOpinionSentences(d,t)
        //array containing sentences about t
    NOTOpinionS←GETNOTOpinionSentences(d,t)
        //list of sentences that do not express an opinion about t
    foreach s ∈ OpinionS do
        val←0
            foreach s_n ∈ NOTOpinionS do
                val←e^(-β·Dis tan ce(s,s_n))• ac(s_n)+val
                weight←e^(-β·Dis tan ce(s,s_n))
            end for
        Result←Result + ac(s) + val/weight
    end for
    Result← Result/Nb
    Return Result
end
```

Referring to FIG. 7, illustrating a flow chart diagram of the Distance—Weighted Topic Focused algorithm, the procedure starts at block 90 "Specifying Document d, topic t", in which the Quantitative Opinion Analysis module 28 receives a signal corresponding to the document of interest as well as the topic of interest. From block 90, information flows to block 92 "Examining sentences in document d" in which all sentences of the document are retrieved and examined for the purpose of finding opinion expressing adjectives in the sentences. Further the logic flows to block 94 "Assigning "initial" score sc(s) and sc($s_n$) to each sentence s and $s_n$", where a variety of methods to score a sentence may be plugged in. In block 94, the algorithm assigns an initial score to sentences s where an expression of opinion (direct or indirect) is found, as well as to the sentences $s_n$ which do not contain an opinion expression about the topic t.

Further, the procedure continues to block 96 "Splitting scored sentences into sc(s) and sc($s_n$)", where two sets of sentences are created, e.g. one set including those sentences having the opinion expression, and another set containing those sentences with no opinion expression found.

The logic then flows to block 98 "For each s and each $s_n$, finding Distance (s, $s_n$)" where for each sentence s expressing an opinion about t and each sentence $s_n$ that does not, the algorithm finds the distance between the sentences.

Further the logic flows to block 100 "For each s, calculating impact of all $s_n$", where the impact of each sentence $s_n$ that does not express an opinion about the topic t is calculated in accordance with Eq. 3:

$$Result = sc(s) + \frac{\sum e^{-\beta Distance(s,s_n)} \cdot sc(s_n)}{e^{-\beta Distance(s,s_n)}} \quad \text{(Eq. 3)}$$

In the block 100 "Averaging of all sc (s)", the sum of all scores of the sentences containing the opinion expression, as well as the impact of all sentences which do not contain the opinion expression, is averaged over the number (m) of sentences s in which the opinion expression is found.

Figure 8:
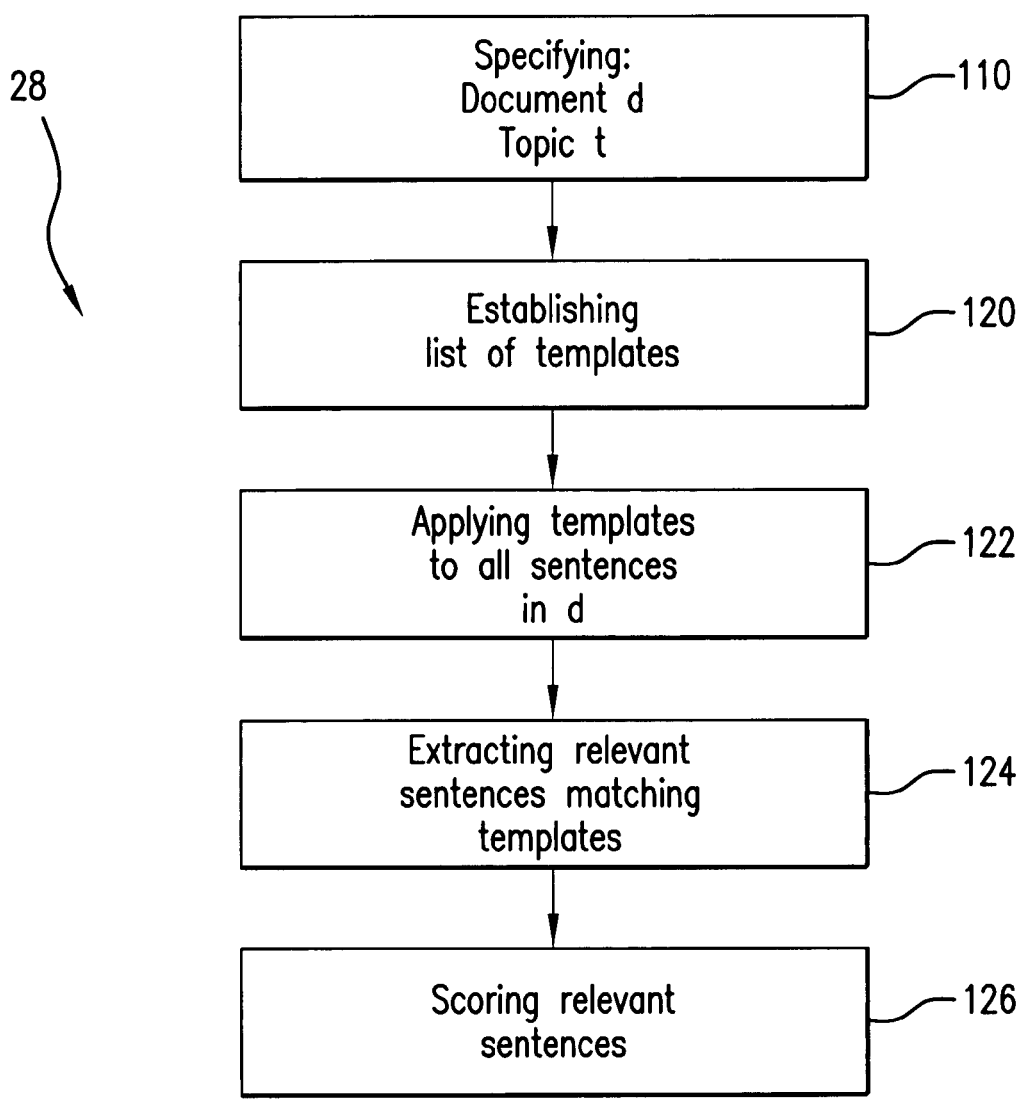
FIG. 8 is a flow chart diagram of the process for Template-based scoring of documents.

Still in an alternative embodiment, the Quantitative Opinion Analysis module 28 is operated in accordance with the Template Based (TB$^{\omega sf}$) algorithm, the flow chart diagram of which is presented in FIG. 8. This algorithm uses a set of templates and only examines sentences that "match" a template. It then may use the same approach as the TF$^{\omega sf}$ algorithm or the DWTF$^{\omega sf}$ algorithm to assign a score. If DWTF$^{\omega sf}$ is used, then any scoring function for scoring sentences may be used.

The template algorithm may be implemented based on a software program, presented for example as follows:

```
function TB(d,Templates, t,sc)
    d is a document
    Templates is a list of templates
Begin
    Result ←0
    value←0
    Relevant = set of sentences i d about topic t foreach s ∈ d do
        foreach temp ∈ Templates do
            if (s match temp) then
                Part of Sentence ← GETPartofSentence(s,t)
                    //string containing part of a sentence that matches
                    a template
                value←value+ac(Part of Sentence)
                n←n+1
            end if
        end foreach
    end foreach
    Result← value/n
return Result
end
```

The procedure of the Template-Based scoring starts in block 110 "Specifying: document d, topic t". The logic flows to block 120 "Establishing a list of templates" in which a list of expressions, clause, and other predetermined lexographic units is established by a user. By having a list of templates, the procedure applies templates to each relevant sentence found in the document d on the topic t in block 122. If a match is found, the relevant sentence matching the templates is extracted in block 124, and a string containing at least a part of sentence that matches a template is scored in block 126 by any scoring algorithm including, but not limited to, the previously discussed Topic Focus algorithm and Distance Weighted Topic Focused algorithm.

Figure 9:
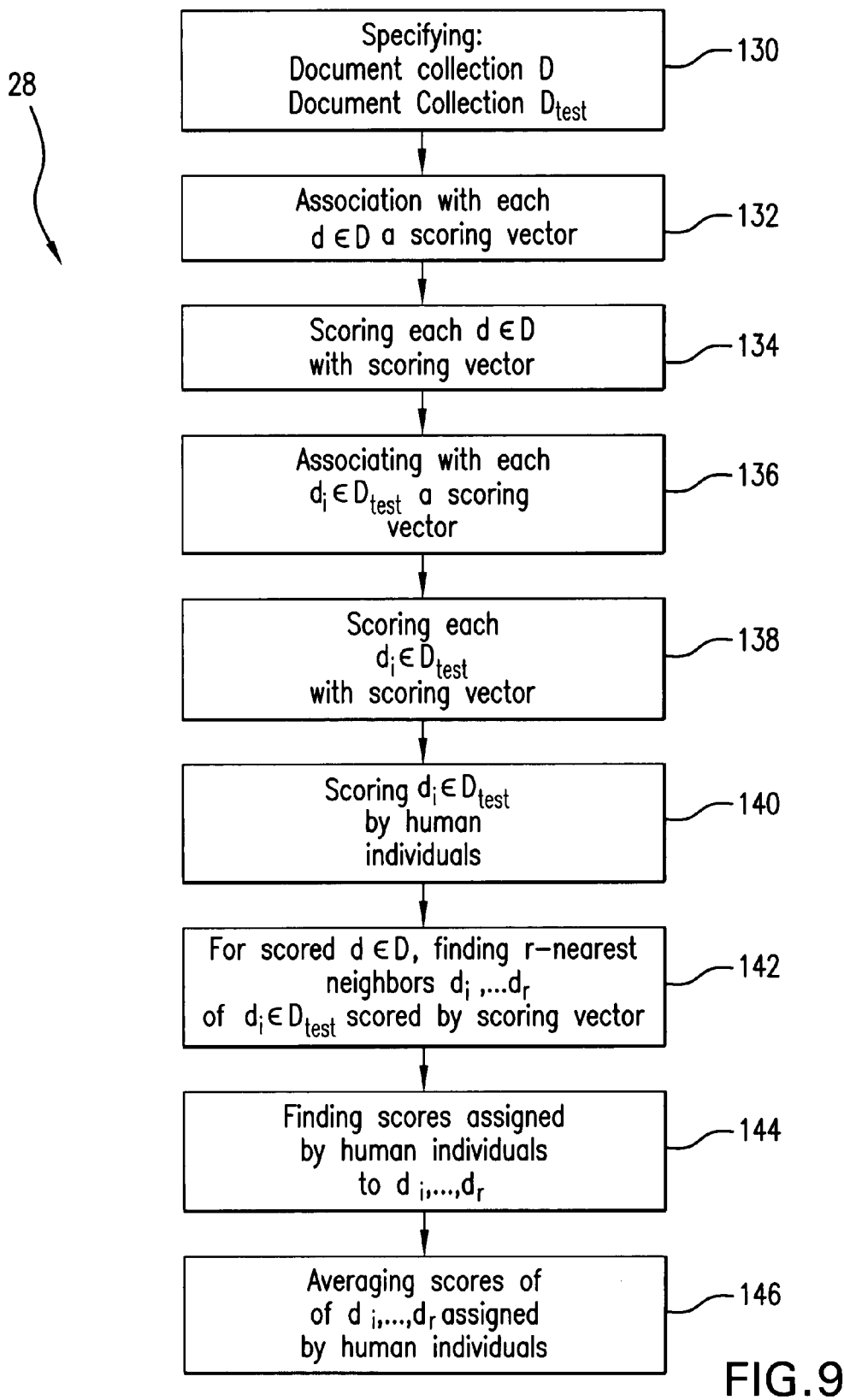
FIG. 9 is a flow chart diagram of the process for Hybrid Evaluation scoring of documents.

Referring to FIG. 9, a flow chart diagram of the Hybrid Evaluation Method (HEM) is presented which is an implementation of an algorithm which is more general than those previously discussed. The $HEM^{\overline{ds},r,m}$ algorithm associates a vector of length m for some integer m with each document d. The vector consists of functions $\overline{ds}=(ds_1, \ldots, ds_m)$ to assign scores to the document. For the three methods listed above (i.e. $TF^{\omega sf}$, $DWTF^{\omega sf}$, $TB^{\omega sf}$) (with any choices for ωsf) may be used to assign scores $s_1, s_2, s_3$ to a document d. In this case, the vector $(s_1, s_2, s_3)$ is associated with d. The same procedure is also applied to all documents in $D_{test}$.

The $HEM^{\overline{ds},r,m}$ algorithm looks at the vectors associated with documents in $D_{test}$ and finds the r-nearest neighbors of the vector associated with d for some number r>0. Suppose these documents in $D_{test}$ are $d_l, \ldots, d_r$. The score returned for document d is the average of the scores assigned to documents $d_l, \ldots, d_l$ by the individuals who evaluated these documents.

As an example, the Hybrid Evaluation procedure may be implemented by the following software program:

Additionally a collection of documents $d_i \in D_{test}$ is specified to be evaluated by individuals.

Further, the procedure flows to block 132 "Associating with each d∈D a scoring vector" in which a vector $\overline{ds}$ of length m is associated with the document. The vector $\overline{ds}$ includes functions which score the document d. In block 132 a variety of document scoring methods may be used, each for assigning a score $s_i$ to the document d. In accordance with the scoring functions specified with the vector $\overline{ds}$, the document is assigned scores $s_1, s_2, \ldots, s_i$ in block 134 "Scoring each d∈D with scoring vector".

From block 134 the logic flows to block 136 "Associating with each $d_i \in D_{test}$ a scoring vector" where all documents belonging to the domain of $D_{test}$ are associated with respective vectors $\overline{ds}_{test}$, each containing specific algorithms for document scorings. The scoring vectors $\overline{ds}$ and $\overline{ds}_{test}$ may differ or coincide.

The procedure further flows to block 138 "Scoring each d∈$D_{test}$ with scoring vector" in which the scores of the documents in $D_{test}$ are obtained in accordance with the vector $\overline{ds}_{test}$.

As the result of the scoring performed in block 138, the Hybrid Evaluation procedure forms a matrix containing the score vector and the index of all documents from $D_{test}$.

The procedure further flows to block 140 "Scoring $d_i \in D_{test}$ by human individuals" in which individuals score the documents belonging to the collection $D_{test}$ and assign to the document a "score—given-by-human-individual". The procedure performed in block 140 may be plugged in at any point of the flow chart diagram shown in FIG. 9 after the document collection $D_{test}$ is specified in block 130, or alternatively the scoring of the $D_{test}$ by individuals may be performed offline.

```
function HEM(d,r,ds,sc_Dtest)
    d is a document
    r is the number of nearest neighbors to be found
    ds is a vector containing a set of scoring algorithms
    sc_Dtest is a matrix containing the vectors of the scores of D_test using
            predetermined algorithms and the score assigned by human
subjects
    begin
        Result←0
        foreach ds ∈ ds do
            value←ds(d)//array of scores of docs using algorithms in ds
        end foreach
        for i = 1 to r do
            ResultDoc[i][1] ← score [i]
                //matrix containing the score vector and the index of d ∈ Dtest
            ResultDoc[i][2] ← number _of_the_Document_in_D_test
        end for
        foreach score ∈ score do
            if (Distance(value, score) < each v ∈ ResultDoc[][1])then
                ResultDoc[i][1] ← score [i]
                ResultDoc[i][2] ← index_of_the_Document_in_D_test
            end if
        and foreach
        foreach element ∈ ResutDoc do
            Score_given_by_human_subject ← sc sc_Dtest (element[][2],2)
            Result ← Score_given_by_human_subjects + Result
        end foreach
        Result ← Result / r
    Return Result
    end
```

The flow chart diagram of the Hybrid Evaluation procedure is initiated in block 130 "Specifying: document d, topic t, document collection $D_{test}$". In this block a user enters a document d to be studied and a topic of interest t into the system.

The procedure further flows to block 142 "For scored d∈D, finding r-nearest neighbors $d_l, \ldots, d_r$ of $d_i \in D_{test}$ scored by scoring vector" in which the HEM algorithm examines the vectors associated with the documents in $D_{test}$ in accordance with blocks 136 and 138, and finds the r-nearest neighbors of the vectors associated with the document d in accordance with data in blocks 132 and 134 for some number r>0.

For example, the r-nearest neighbors are $d_1, \ldots, d_r$ of the collection $D_{test}$ are found. The procedure continues to block 144 "Finding scores assigned by individuals to $d_1, \ldots, d_r$" in which the algorithm retrieves scores assigned by individuals to the documents $d_1, \ldots, d_r$ found in block 142. Upon accomplishing the process in block 144, the logic proceeds to block 146 "Averaging scores of $d_1, \ldots, d_r$ assigned by human individuals" where the score for document d is calculated as the average of the scores calculated in block 144 for the documents found in block 142.

Returning to FIG. 2, the opinion analysis system 10 of the present invention, in addition to the Quantitative Opinion Analysis Module 28, includes a Qualitative Opinion Analysis Module 30 to provide a qualitative score reflecting the opinion expressed about topic t by a given document d. The qualitative adjective scoring algorithm Qualscore assumes that the rating scale is a list of adjectives (or adjective adverb combinations) $a_1, \ldots, a_n$ in increasing order of "positiveness" of the adjective (e.g. for example, POSITIVE, HARSH, VERY HARSH) together with a sequence of n−1 threshold values $0 \leq t_1 \leq \ldots \leq t_{n-1} \leq 1$. These adjectives are used to rate a document. The actual words used in deciding what the rating of the document are chosen from the Scored Opinion Expressing Words Bank 26.

For instance, if the rating scale is POSITIVE, HARSH, VERY HARSH, threshold values 0.4, 0.7 may be used to indicate that any document with a score between 0 and 0.4 is considered POSITIVE, a document with a score between 0.4 and 0.7 is considered HARSH, and a document with a score between 0.7 and 1 is considered VERY HARSH.

The range of threshold values may be automatically obtained by the following technique:

any document scoring method described in the preceding paragraphs may be used to score the document d. Then the nearest neighbor $d_{nn}$ of the document d in the set $D_{test}$ of test documents may be found and a qualitative score assigned by an individual may be used to rank the document under study.

The qualitative document rating may be performed, for example, by implementing the following software programs:

---

```
function Qualscore d,r,ds,sc_Dtest,Templates,t)
begin
    Result ← 0
    value ← 0
    foreach ds ∈ ds do
        value ← ds(parametes)//array containing the score of a
                              //document according with the algorithm in ds
    end foreach
    IDinD_test ← findNearest(value)
    Result ← getQualScore(IDinD_test)
return Result
end
```
---

Figure 10:
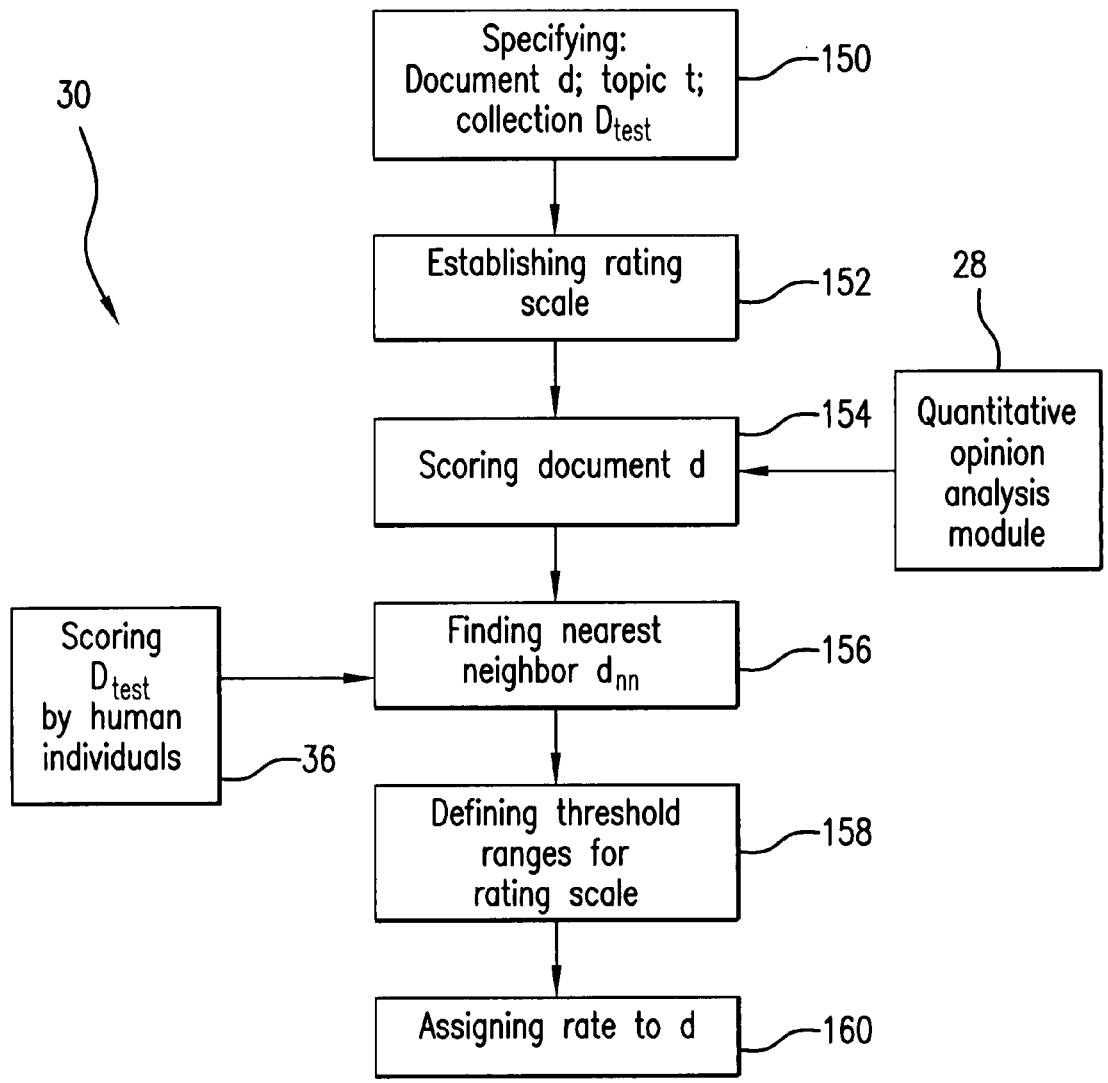
FIG. 10 is a flow chart diagram of the procedure for qualitative scoring of documents.

The qualitative adjective scoring procedure presented in FIG. 10 begins in block 150 "Specifying: document d, topic t, collection $D_{test}$". Further, the logic flows to block 152 "Establishing a rating scale" in which a least of adjectives $a_1, \ldots, a_m$ increasing order of "positiveness" of the adjective is established which are used by the qualitative adjective scoring algorithm for rating a document d.

The logic further continues to block 154 "Scoring document d" which applies any of the quantitative opinion scoring algorithms from block 28 to score the document d under study quantitatively.

The logic flows to block 156 "Finding nearest neighbor $d_{nn}$" where the nearest neighbor of the document d is found in the set $D_{test}$ of the test documents scored by individuals in block 36 (presented in FIG. 3). Upon finding a nearest neighbor $d_{nn}$ of the document d in the set $D_{test}$ of test documents, the procedure flows to block 158 "Defining threshold ranges for the rating scale" where a qualitative score assigned by an individual for the document $d_{nn}$ is retrieved. The correspondence between the numerical score and the descriptive rating (qualitative score) of the document $d_{nn} \in D_{test}$ serves to identify threshold ranges corresponding to adjectives in the rating scale presented in block 152. For example, if the rating scale is a list of the adjective: "positive", "harsh", "very harsh", then the following threshold values may be used to qualitatively rate a document: for example a score between 0 and 0.4 may be considered as corresponding to positive rating, a score between 0.4 and 0.7 may be considered as harsh rated, and a score between 0.7 and 1 may be considered very harsh rated.

A prototype opinion scoring system using Java to implement the user specification module, web spider, and all the scoring algorithms have been constructed and tested. The prototype system uses Oracle to store and index news articles. The system runs on a 3 GHz Pentium IV Windows 2003 Server with 1 GB of RAM.

The algorithms have been "trained" using a corpus of 352 news articles on 12 topics drawn from various US news sources. One hundred of these news articles were evaluated by 16 individuals to build up the Scored Opinion Expressing Words Bank. The adjective scoring methods described in previous paragraphs have been used. Table 1 shows the scores assigned to certain adjectives (with k=2) for the Pseudo-Expected Value Word scoring and Pseudo-Standard Deviation Adjective scoring:

TABLE 1

| Adjective | $Pevs^2$(word) | $Psds^2$(word) |
|---|---|---|
| ludicrous | 0.45 | 0.51 |
| misleading | 0.38 | 0.48 |
| rabid | 0.75 | 0.71 |
| gruesome | 0.78 | 0.81 |
| hideous | 0.08 | 0.13 |
| ... | ... | ... |

As may be seen, the words such as "rabid" and "gruesome" are considered "harsher" rather than "misleading."

Measuring Accuracy. The algorithms are applied to assess the intensity of opinion in a set of weblogs spanning about 1000 HTML pages posted randomly over the last three years. Weblogs are different from traditional web pages as they may consist of a concatenation of messages authored by a single individual or a group of individuals, thus structurally differing from traditional web pages. Since the contents of a weblog can be highly diverse and may contain information about a variety topics, news articles are generally chosen for the training process instead of weblogs themselves.

For evaluation purposes, a set of 15 individuals has been used which did not overlap with those who trained the system and scored the adjective bank.

Precision Study In this study, for each document i and topic j considered, the result hybrid ($d_{ij}$) obtained by the hybrid evaluation algorithm and the average value user ($d_{ij}$) of the individuals values are compared.

A set Accepted δ of each other for a given δ is defined. In this case the precision is defined as:

$$\text{Accepted}_\delta = \{d_{ij} : |\text{Hybrid}(d_{ij}) - \text{User}(d_{ij})| < \delta\} \quad \text{(Eq. 4)}$$

Intuitively, Accepted, is the set of all document-topic pairs where the human subject values and the Hybrid algorithm values are close enough (i.e. within δ of each other for a given δ). In this case the precision is defined as:

$$Precision_\delta = \frac{|Accepted_\delta|}{n} \quad (Eq.\ 5)$$

where n is the total number of documents.

Figure 11:
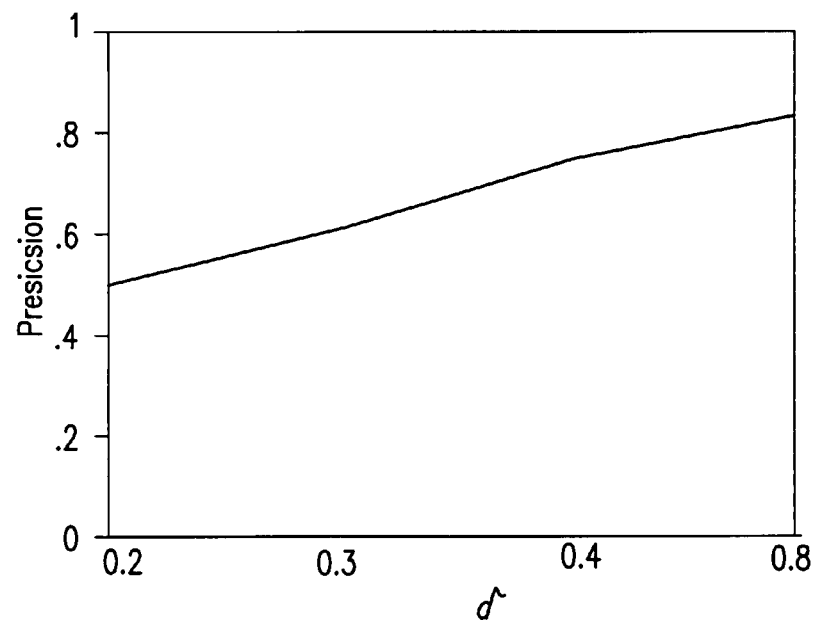
FIG. 11 is a graphical diagram representing precision of the opinion scoring versus different values of δ.

FIG. 11 shows precision results for different δ s.

A Precision/Recall Study: To measure recall, the entire interval [0,1] of scores is split into several subintervals. For each interval int, let Retr(int) be the set of all news articles retrieved by the system which have a score inside the int interval. Let UserInt(int) be the set of all documents where the user score is inside int.

The Accepted, set with regard to each interval interv is:

Acceptedδ(int)=$d_{ij}$: {Hybrid($d_{ij}$)−User($d_{ij}$)|≦δ with $d_{ij}$∈Retr(int)} (Eq. 6)

The precision and recall are defined as follows:

$$Precision\delta(interv) = \frac{|Accepted_\delta(interv)|}{|Retr(interv)|} \quad (Eq.\ 7)$$

$$Recall_\delta(interv) = \frac{|Accepted_\delta(interv)|}{|User(interv)|} \quad (Eq.\ 8)$$

Figure 12:
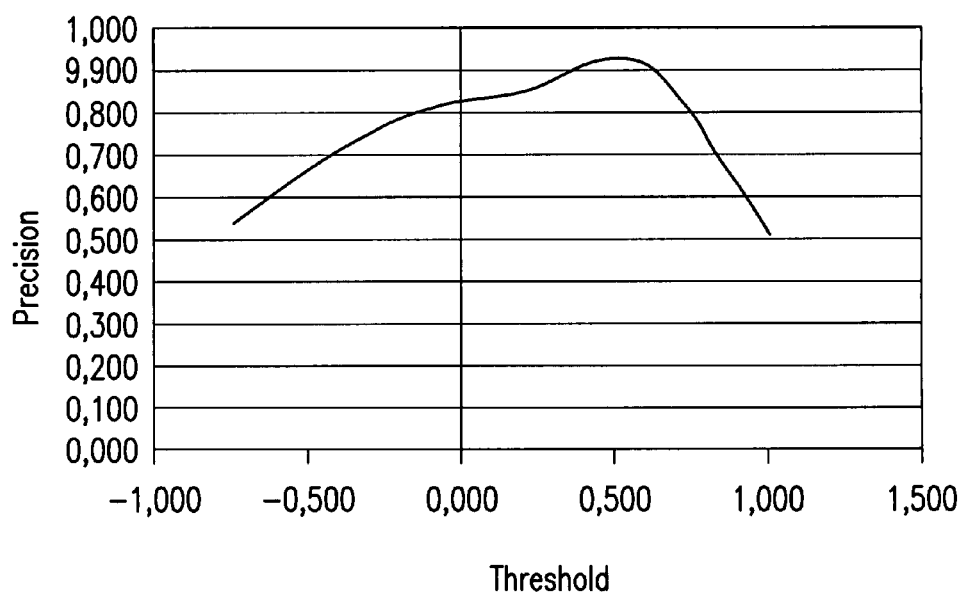
FIG. 12 is a graph representing a precision of the opinion scoring versus threshold.
Figure 13:
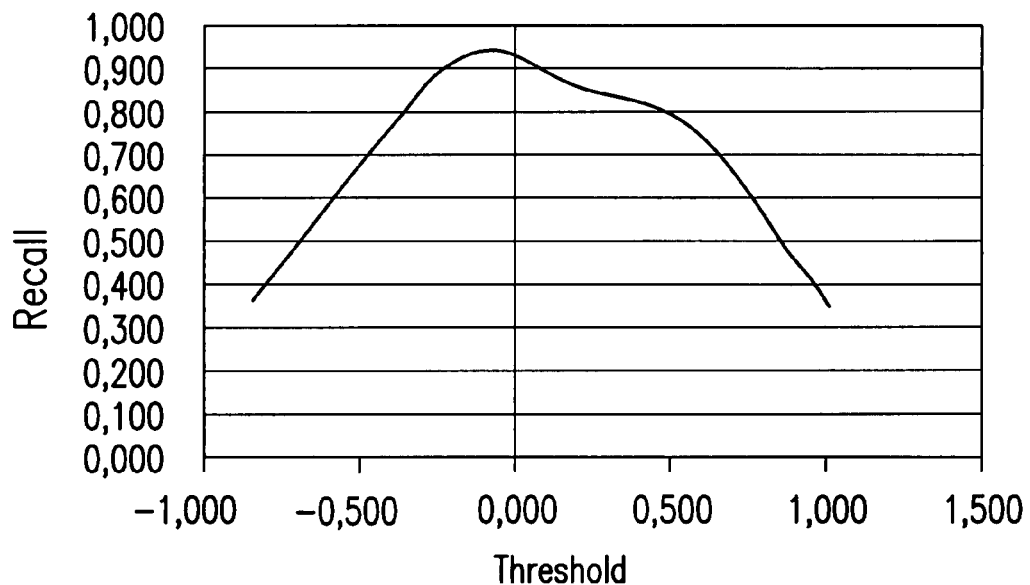
FIG. 13 is a graph representing a recall characteristics versus threshold.

FIGS. 12-13 show the precision and recall curves generated.

When the threshold is between 0.4 and 0.6, the system has a precision of 91% in detecting the "positive" weblogs and a recall of 73%. The system is also able to identify weblogs containing negative judgments: the precision in the "negative" region is approximately 78% with a recall of 91%. In identifying the "very negative" weblogs, a precision of 55% and a recall of 37% is obtained. In conclusion, the present system is capable of accurately identifying positive, neutral and negative weblogs but needs work to better identify the "very positive" and "very negative" weblogs. In fact, in that region a precision a little bit higher than 50% is obtained.

Correlation Study. In addition, the average Pearson correlation of the present method has been computed on a −1 to +1 scale where any positive correlation figure defines a positive correlation between human scores and between the algorithm scores. It has been found that the average correlation between a set of human scorers of documents and the scores provided by the present system was 0.342, which is considered to be positively correlated with human scorers.

Figure 14:
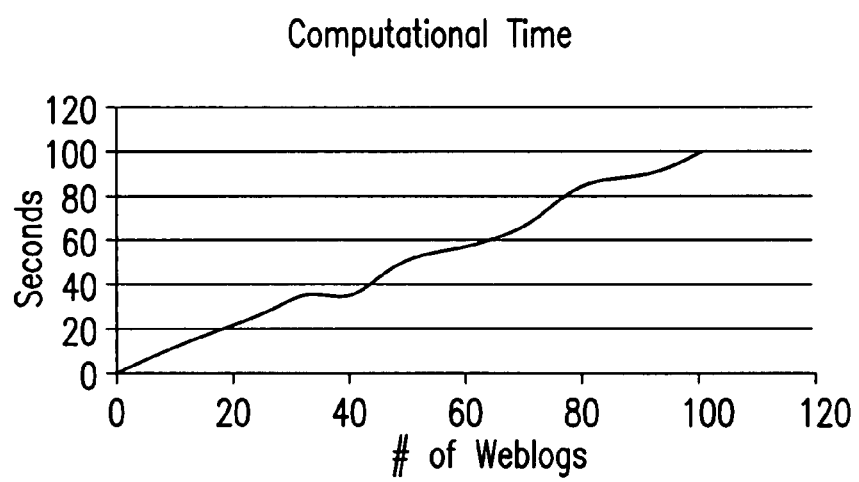
FIG. 14 is a graph representing a computational time versus number of documents.

Measuring Computation Time. The performance of the novel algorithms is measured in terms of computation time. In general, the present system takes about 1 second for each weblog to calculate the vector containing the score of the algorithms and to attribute the result for a given weblog in accordance with the hybrid algorithm. The computational time for such system increase linearly with the number of weblogs, as clearly shown in the FIG. 14 for the first 100 weblogs.

The present opinion analysis system delivers a measure of the intensity of opinion that a document d expresses about a given topic t. The system is based on a general purpose architecture that can neatly embed a wide variety of scoring functions developed by the Applicants as well as others. The system is not limited to a single specific scoring technique, but also may use a plurality of scoring methods merged together by the Hybrid Evaluation scoring module to score a harshness of a document or a topic of interest.

The present opinion analysis system employs human assessments of test data to learn the "intensities" of words and phrases in an Opinion Expressing Words Bank. A set of quantitative models is developed to compute the intensity of opinion expressed by a document on a given topic. Additionally, a qualitative scoring model is included that classifies documents according to qualitative ratings. The algorithms work efficiently and the ratings produced match human ratings closely. The system provides a continuum of ratings for words, both adjectives and non-adjectives. The scores for the opinion expressed in a document are likewise continuous, although binary scoring is also within the scope of the concept.

In addition to above-referenced unique qualities and features, the present opinion analysis system is capable of working in a multilingual domain which addresses the need for analyzing the intensity of opinion expressed in a set of documents in a wide variety of languages.

Figure 15:
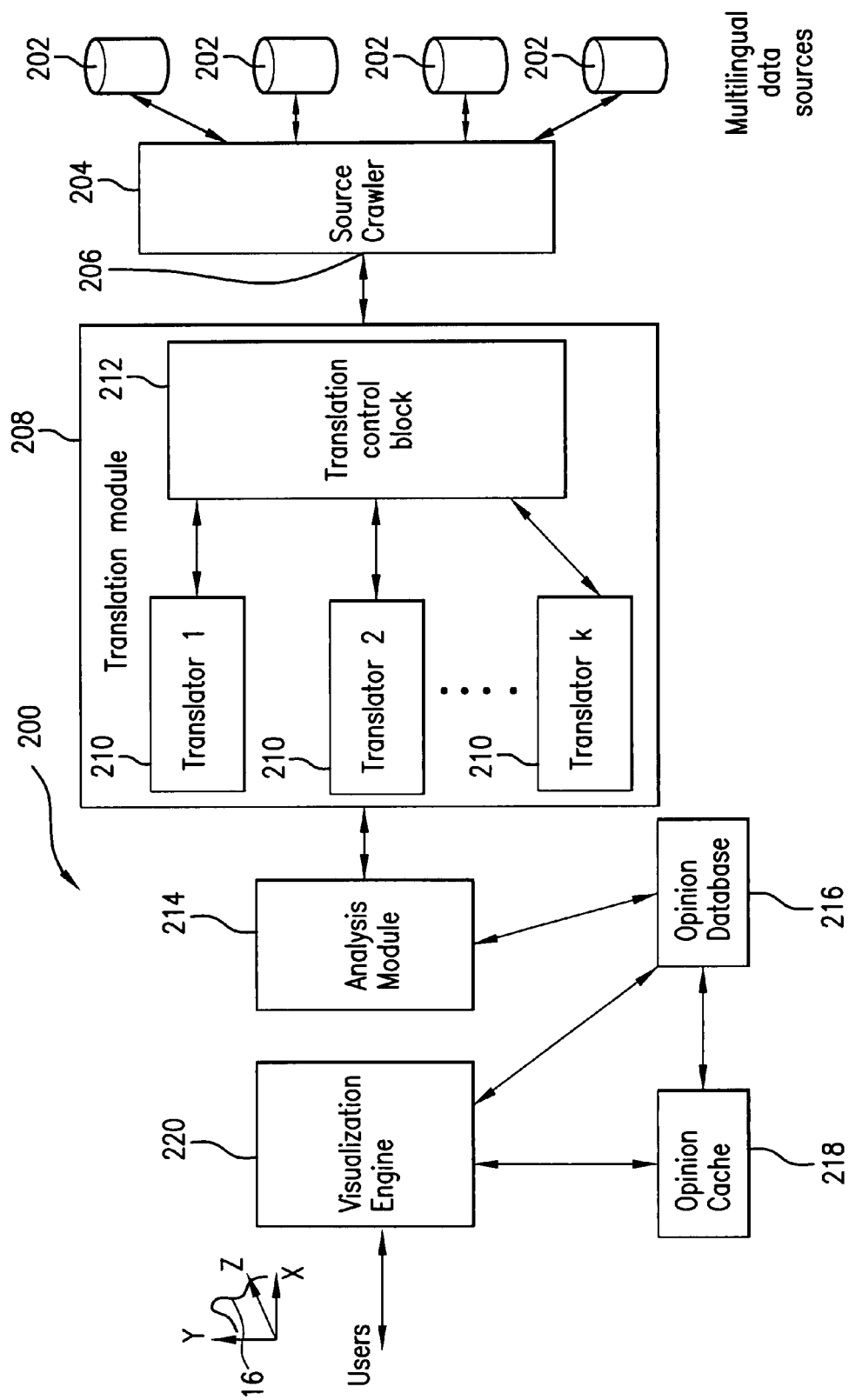
FIG. 15 is a block diagram of the opinion analysis system of the present invention adapted for operation in a multi-lingual domain.

Referring to FIG. 15, the present opinion analysis system 200 includes a set of multilingual data sources 202 scattered across a network, e.g. news sources, blog sources, news groups, etc. For all these data sources, a developer specifies the following information:

The network locations of the documents desired to be tracked, e.g., a website location needs to be specified for each document.

A user may specify whether it is desired to use all documents stored in the source's directories, or specific group of the documents such as, for example, after a certain date or pertaining to a certain topic, or whether a certain type of news feed is preferred, e.g. an RSS feed from the source.

It may be desirable to specify what kind of metadata about each document needs to be retrieved, e.g. web, URL, data posting, date of the article, etc.

A Source Crawler 204 takes as an input a set of the specified information. The Source Crawler visits an identified website and searches for a kind of news feed, e.g. for example an RSS feed if identified, using standard text search techniques. Alternatively, the Source Crawler tracks all directories in the website by using standard crawling techniques. It produces, at an output 206, a set of all documents in the source that are in view since the last time the crawler visited the site. The Source Crawler may run continuously, so that the set of documents produced as an output in this manner, together with a relevant metadata, is sent to a translation module 208. The translation module 208 is capable of using a plurality of translators 210, which may be based on any translation software independent of whether it is web based translation software, or installed on a local machine. A multiplicity of commercial translators 210 such as for example Babelfish, the dictionary.com translator, Systran, etc. may be used in the architecture of the multilingual opinion analysis system 200 of the present concept.

The translation module 208 includes a translation control block 212 which controls the function of the translation module 208.

Figure 16:
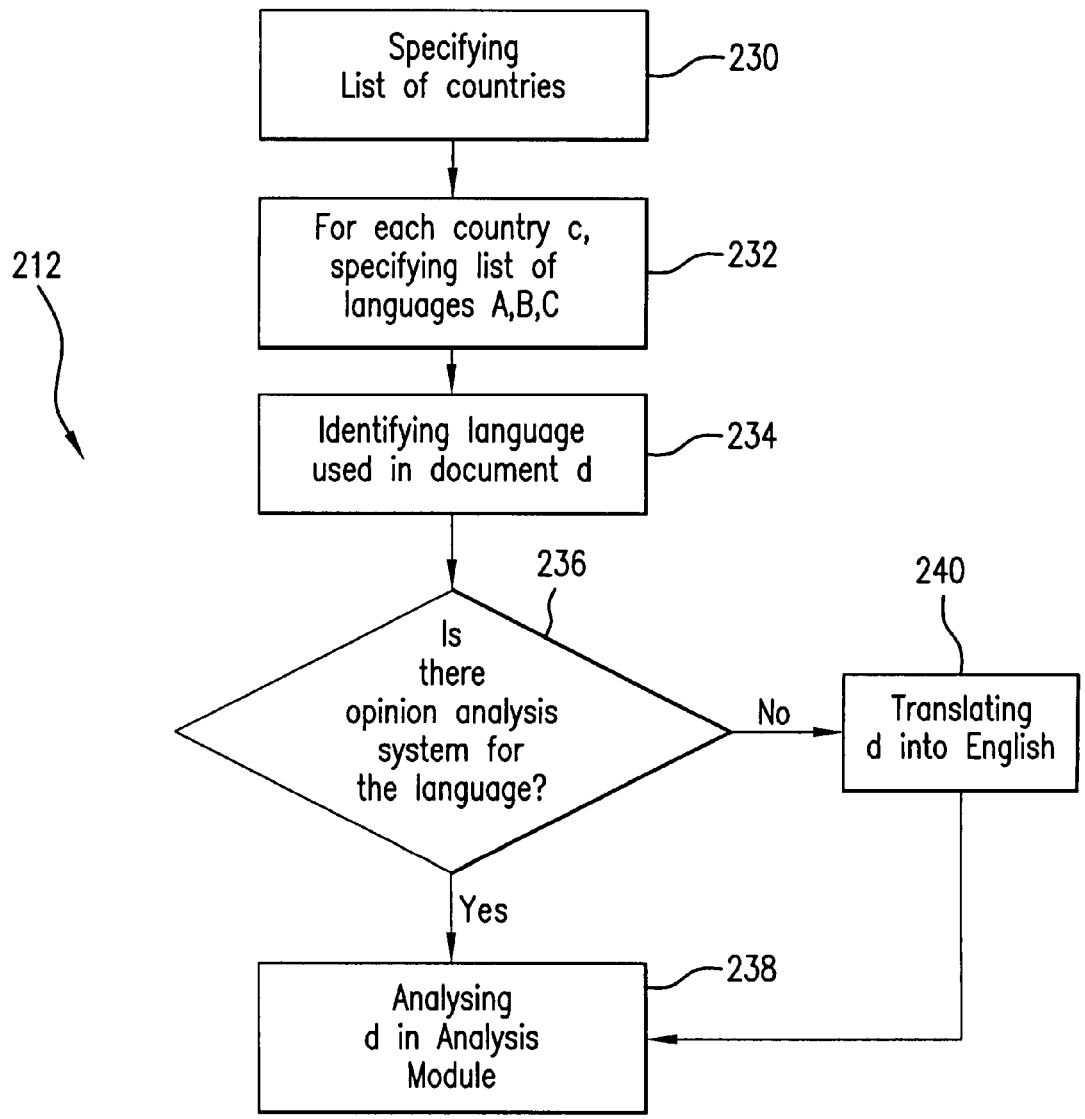
FIG. 16 is a flow chart diagram representing a translation procedure of the opinion analysis system of the present invention.

FIG. 16 represents a flow chart diagram of the control process of the translation control processing block 212 running in the translation module 208. The procedure starts in block 230 "Specifying list of countries c". Further the procedure flows to block 232 "For each country c, specifying list of languages A, B, C" where the system uses a list of languages commonly used in that country. For example, a country c may use three languages A, B, C. The architecture uses parsers and the dictionaries to identify the language used in a document. The logic flows to block 234 "Identifying language used in document d", specifics of which are presented in FIG. 17. Upon identifying the language used in document d, the logic flows to block 236 "Is there opinion analysis system for the language?". If the analysis module 214 is capable of analysis the identified language of the document d, the document is transferred to an opinion analyzer in the analysis module 214, together with the ID of the opinion analysis algorithm to be used for the identified language. Then the system analyzes the document in block 238 "Analyzing d in Analysis Module".

If however the Analysis Module 214 is not readily agreeable with the language identified for the document d, a respective translator 210 is applied to the document d to translate it from the identified language to English (or to other languages for which the Analysis Module 214 is adapted) in block 240 "Translating into English". The translated document, along with the relevant metadata is then sent to the Analysis Module 214 for being analyzed in block 238.

Figure 17:
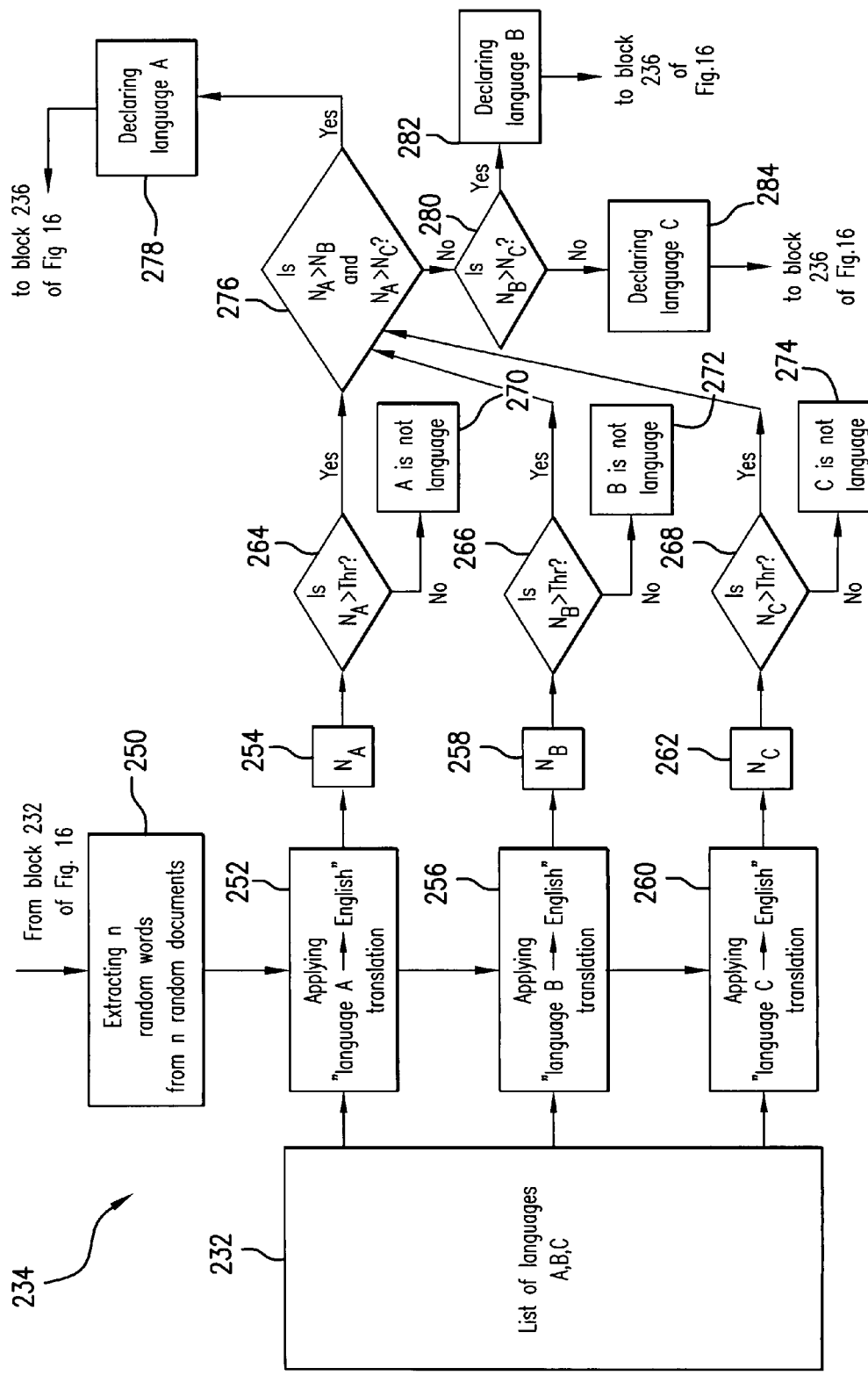
FIG. 17 is a flow chart diagram of the procedure for identifying the language of a document in the translation module of the opinion analysis system of the present invention.

Referring to FIG. 17, representing a subroutine of block 234 of FIG. 16, the procedure starts in block 250 "Extracting n random words from n random documents", where the logic randomly samples words from a random set of documents, e.g. for example 50 words from 50 documents. The logic flows further to block 252 "Applying Language A→English translator" to translate the randomly selected n words in block 252. A number of words Na correctly translated into English using the Language A→English translator is identified in block 254. In the similar manner, "Language B→English translator" and "Language C→English translator" are applied to the document d in blocks 256 and 260, respectively. A number of words $N_b$ and $N_c$ which were accurately translated into English from the languages B and C, respectively, are identified in blocks 258 and 262 respectively. It is clear, that instead of translation into English, a translation into any language in which the Analysis Module 214 is capable of analysis may be used.

Each of the numbers $N_a$, $N_b$, and $N_c$ in blocks 254, 258 and 262 is compared with a threshold percentage in blocks 264, 266 and 268 respectively.

If in block 264, $N_a$ does not exceed the threshold, the system identifies language A as not the language of the document d in block 270. Similarly, if $N_b$ does not exceed the threshold in block 266, the logic identifies the language B as not the language of the document d in block 272. Likewise, if in block 268, $N_c$ does not exceed the threshold, the system identifies the language C as not the language of the document d.

If however, in at least one of the blocks 264, 266 and 268, the number of translated words exceeds a threshold, the logic identifies that the document may be in that language. If however more than one language exceeds the threshold, than the language with the highest percentage of accurately translated words can be selected as the language of the document d. For this, the procedure flows from block 264 to block 276 "Is $N_a > N_b$ and $N_a > N_c$?" If this is the case, the procedure is ended in block 278 "Declaring language A" in which the language A is declared as the language of the document d.

If however, in block 276 $N_a$ does not exceed $N_b$ and/or $N_c$, the logic flows to block 280 to check whether $N_b$ is bigger than $N_c$. If this is the case the logic flows to block 282 to declare language B as the language of the document. If however $N_c$ is bigger than $N_b$ in block 280, the logic flows to block 284 to declare language C as the language of the document. The results of the procedure shown in FIG. 17, either from block 276, 280, or 284 returns to block 236 of FIG. 16 for opinion analysis of the document d in the Analysis Module 214.

The Analysis Module 214 preferably contains the opinion analysis system 10 shown in FIGS. 1-10. However, alternatively, the Analysis Module 214 may include any algorithm capable of opinion analysis in a single language. A broad spectrum of algorithms may be used to identify relevant topics in a given translated document and to analyze the intensity of opinion on a given topic in that document, including those developed by the Applicants of the present concept, as well as other applicable techniques.

It is important to note that even if a translation of the document made in one of the translators 210 is not satisfactory, many of the algorithms of the Analysis Module 214 are still capable of generating a correct answer from the point of view of intensity of opinion.

For example, for the following text contained in an Italian newspaper, La Repubblica, in an article of Sep. 13, 2006: "Al termine del confronto, giudicato deludente, Cgil, Cisl e Uil Hanno confermanto la proclamazione di una giornata di sciopero da svolgere entro la fine del mese." the Babelfish English translation is:

"To the term of the comparison, disappointing sentence, Cgil, Cisl and Uil have confirmed the proclamation of one day of strike to carry out within the end of the month."

The translation is grammatically poor but it is sufficient to understand what happened in those lines and assess the opinions expressed.

Returning to FIG. 15, the multilingual opinion analysis system 200 further include an Opinion Database 216 which is a relation database including document ID, topic, scores, metadata. This scheme for the opinion database specifies:

A document ID, e.g. usually a reference to where the document is physically stored in the multilingual opinion analysis system;

A topic t that has been extracted from the document;

The score (s) extracted from the English translation of that document by using one or more existing opinion analysis algorithms as well as the analysis described in previous paragraphs with regard to the system 10 illustrated in FIGS. 1-10.

The multilingual opinion analysis system 200 of the present invention further includes an Opinion Cache 218. The Opinion Database 216 grows excessively large and fast while information is added thereto. For example, in the multilingual opinion analysis system currently under the test, there are over 5 million news wires with about 5 topics identified per news wire. This means that there are around 15 million rows in the table currently. Moreover, the Opinion Database is growing at the rate of approximately 70,000 new documents per week which means that there are about 200,000 additional rows in the table added each week. The Opinion Cache 218 is a high speed in-memory storage server that allows some part of the data to be precomputed and stored in memory so that it may quickly be "served up".

For example, if a user is interested in tracking data over the last two months, the system can identify those rows in the opinion database that were published on the web in the last two months. For each topic t mentioned in the last two months, the system 200 computes a daily score over the last two months. The opinion cache then has a scheme (topic, date, score) specifying the score of the topic on a given date (date where the topic was not mentioned need not to be stored in the cache). Additional metadata can be stored as well. In this manner, when a user is interested in the data, it may be retrieved with precomputed statistics previously stored in the Opinion Cache 218.

The caching strategy may be modified as needed by the user. For example a different window of time may be used, or only topics that have been accessed by users sufficiently frequently are to be stored in the Opinion Cache (above some threshold of use), etc.

When a user poses a query, the system accepts it through a Visualization Engine 220. The architecture of the present system support visualization by any method to visualize multi-dimensional data and to provide a multi-dimensional (2-D, 3-D, or 4-D) data output.

Figure 18:
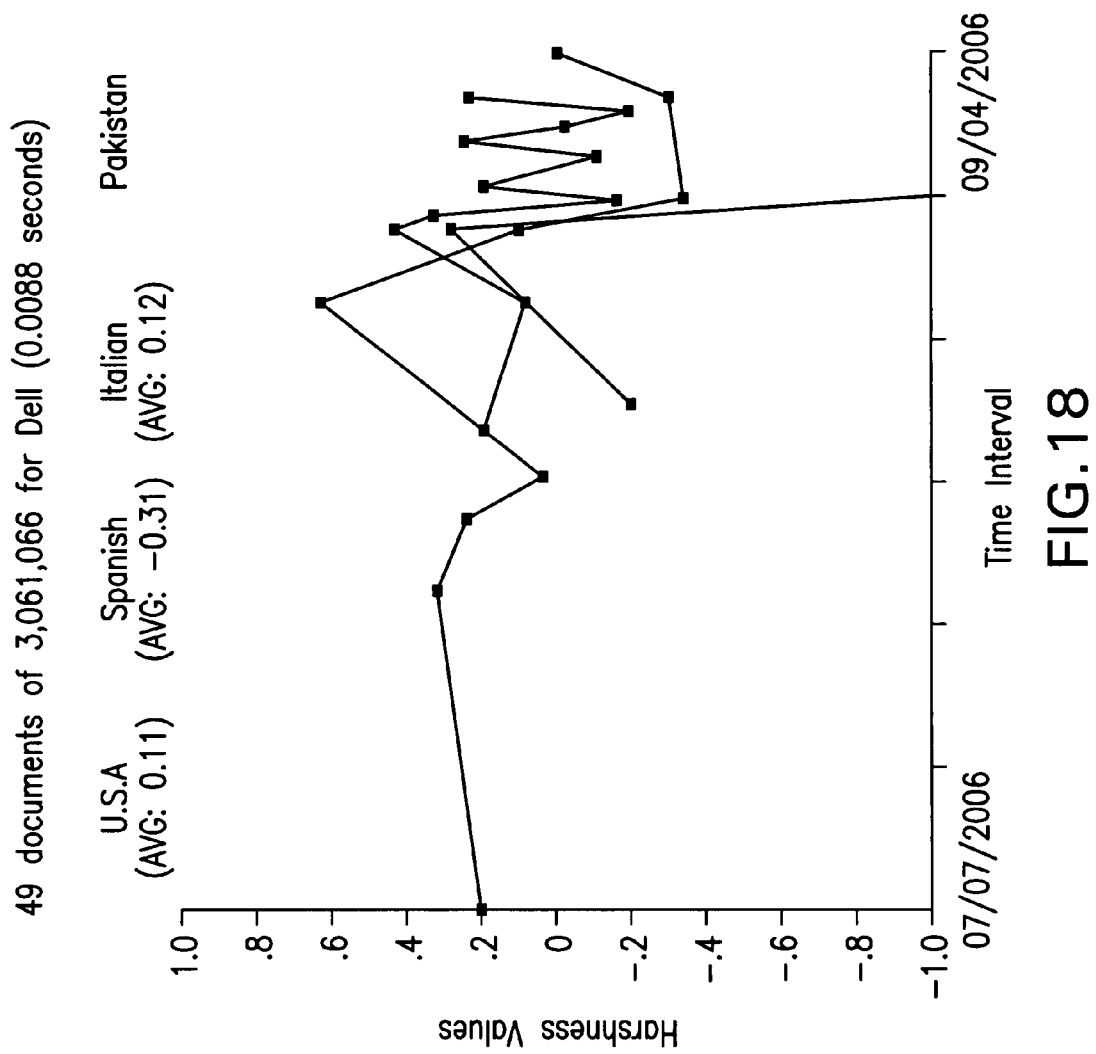
FIG. 18 is a two-dimensional diagram of the output generated by the opinion analysis system with four countries and three languages.

For example, when a user uses the Visualization and Query engine 220 to pose a query, e.g. about a particular corporation, the system generates the opinion analysis and outputs the result as a graph 16 shown in FIGS. 1, 15 and 18. The x-axis and y-axis denote two dimensions of the graph 16. X-axis of the graph 16 corresponds to the date, e.g. timeline analyzed for example for the last two months. The y-axis of the graph represents the intensity of opinion averaged across the documents that reference the topic in question on the date in question.

The graph represented in FIG. 18 is a 2-dimensional graph of the opinion analysis where the intensity of opinion varies from "−1" to "+1" where "−1" denotes a maximally negative opinion, while "+1" denotes a maximally positive opinion. This is the opinion intensity vs. time interval curve on the particular corporation activity during August-September 2006 revealing the drop in the press after some pertinent event. As can be seen, the graph includes information on four countries (U.S.A., Spain, Italy, and Pakistan) and three languages (English, Spanish and Italian). The information was obtained using news sources from the USA, Spain and Italy.

However, a third dimension may be valuable as well. Third dimension may want to show how the opinion on a topic varies over time by country. In this case, a new dimension may be introduced, by denoting a country, or simply use a 2D graph with multicolored lines. For example, a blue line may show variance in US opinion, while a green line may show variance in Italian opinion. Alternatively, the blue line may represent a particular news agency's opinion on a given topic, while the green line may denote another agency opinion on the same topic.

The multilingual opinion analysis architecture 200 permits to use any 3-dimensional visualization methods known in the art. Likewise, the multilingual opinion analysis architecture also permits any interface technology to visualize 4-dimensional data, for example, for country, source, time and intensity.

The multilingual opinion analysis architecture is believed to be the only architecture in existence today that can simultaneously deal with opinion expressed in multiple languages. If a language has an opinion analyzer specialized for it, the multilingual opinion analysis architecture can leverage it. If however such an opinion analyzer is not available, the multilingual opinion analysis architecture applies any known translator to translate the document into English in order to extract opinions from it. It can apply any 2-D, 3-D, or 4-D visualization methods to visualize the trends of the change of the opinion on a given topic over time. The opinion database and opinion cache support the amount of multilingual data that can be analyzed.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A system for analysis of an opinion expressed in documents with regard to a particular topic, comprising:

a language independent data processing system including a processor;

an opinion analysis module contained in said data processing system;

a Scored Opinion Expressing Words Bank operatively coupled to said opinion analysis module and including pre-calculated word scoring functions assigning respective scores to predetermined opinion expressing words and phrases;

a specification unit specifying at least one source of documents, and a topic of interest;

a document retrieving unit operationally coupled to said specification unit and retrieving at least one document d on said topic of interest from said at least one source of documents for entrance into said opinion analysis module;

said opinion analysis module having an opinion intensity scoring unit computing, at least on a continuous numerical scale, an intensity of an opinion expressed in said at least one document d on said topic of interest, said opinion analysis module being adapted to at least one respective language, wherein said opinion intensity scoring unit computes the intensity of the opinion expressed in said at least one document d on said topic of interest through the computational sequence of operations selected from a group consisting of:

computational sequence of operations A including:

extracting a set of sentences s expressing the opinion about said topic of interest from said at least one document d, in each said sentence s expressing the opinion about said topic of interest, finding opinion expressing words $\omega$ and synonyms $\omega'$ thereof, for each of said $\omega$ and $\omega'$, extracting a corresponding score from said Scored Opinion Expressing Words Bank, adding said extracted scores for all $\omega$ and $\omega'$ in said each sentence s, and averaging said added score of all said sentences s in said set thereof in said at least one document d;

computational sequence of operations B including:

assigning "initial" score sc(s) and $sc(s_n)$ to each sentence s and $s_n$ expressing opinion and not expressing opinion, respectively, on said topic of interest based on said precalculated word scoring functions of at least portion of said predetermined opinion expressing words and phrases contained in said Scored Opinion Expressing Words Bank and detected in said sentences s and $s_n$, splitting said scored sentences s and $s_n$, for each said s and each said $s_n$, finding a distance therebetween in said at least one document d, for each said s, calculating an impact of all $s_n$ thereon, and averaging all sc(s) and impacts of all $sc(s_n)$;

computational sequence of operations C including:
  establishing a list of lexographic templates,
  applying said lexographic templates to the sentences in said at least one document d, extracting sentences expressing the opinion about said topic of interest in said at least one document d matching at least one of said lexographic templates, and
  scoring the relevant sentences; and
computational sequence of operations D including:
  specifying a document collection D,
  specifying a document collection $D_{test}$,
  associating with said at least one document d∈D a first scoring vector corresponding to a plurality of scoring techniques,
  scoring said at least one document d∈D in correspondence with said first scoring vector,
  associating with each document $d_i \in D_{test}$ a second scoring vector corresponding to a plurality of scoring techniques,
  scoring each said document $d_i \in D_{test}$ in correspondence with said second scoring vector,
  scoring each said document $d_i \gamma D_{test}$ by human individuals,
  for said scored d∈D, finding r-nearest neighboring documents $d_i$(1=, ... , r) scored by the second scoring vector,
  finding scores assigned by human individuals to said documents $d_i$(I=1, ... , r), and
  averaging said scores assigned to said documents $d_i$(I= 1, ... , r);
a translation module operatively coupled between said document retrieving unit and said opinion analysis module, wherein said translation module identifies a language of said at least one document d received thereat, translates said at least one document d into said at least one language if said identified language differs from said at least one respective language, and outputs translated said at least one document d to said opinion analysis module, thereby rendering said data processing system language independent in a multi-language domain; and
an opinion intensity representation unit outputting said computed opinion intensity in a multi-dimensional format.

2. The system of claim 1, wherein said opinion intensity scoring unit further includes a quantitative opinion analysis module computing said opinion intensity on said continuous numerical scale.

3. The system of claim 2, wherein said quantitative opinion analysis module further computes said opinion intensity on a binary scale.

4. The system of claim 1, wherein said opinion intensity scoring unit includes a qualitative opinion analysis module qualitatively rating intensity of opinion expressed in said at least one document on said topic of interest.

5. The system of claim 1, wherein said specification unit further specifies a time period of interest.

6. The system of claim 1, further comprising:
a translation module operatively coupled between said document retrieving unit and said opinion analysis module, said translation module including a language identifying unit identifying a language used in said at least one document d.

7. The system of claim 6, wherein said translation module further includes at least one translation unit translating said identified language used in said at least one document d into English.

8. The system of claim 1, wherein said opinion intensity representation unit including a multi-dimensional visualization engine operatively coupled to said opinion analysis module and outputting said computed opinion intensity of a plurality of documents d using multiple text languages.

9. The system of claim 1, wherein said opinion intensity scoring unit further includes a Hybrid Evaluation Module assigning scores to said opinion intensity of said at least one document by merging a plurality of opinion intensity scoring techniques.

10. A system for analysis of an opinion expressed in documents on a particular topic in a multi-lingual domain, comprising:
a language independent data processing system including a processor:
  a data retrieving unit retrieving documents relevant to a topic of interest from a plurality of sources of documents in a multi-lingual domain;
  a translation module operatively coupled to said data retrieving unit and receiving said retrieved documents therefrom, said translation module including at least one translator unit and a language identifying unit identifying a language used in each retrieved document received at said translation module; and
an opinion analysis module operatively coupled to said translation module to compute intensity of opinions on said topic of interest expressed in documents received from said translation module, said opinion analysis module including an opinion analysis unit adapted to at least one respective language;
a Scored Opinion Expressing Words Bank operatively coupled to said opinion analysis module and including pre-calculated word scoring functions assigning respective scores to predetermined opinion expressing words and phrases;
wherein, if said identified language corresponds to said at least one respective language, said translation module outputs said each retrieved document to said opinion analysis module, and
if said identified language differs from said at least one respective language, said translation module applies said at least one translator unit to said each retrieved document to translate said identified language into said at least one respective language; and
wherein upon said translation has been accomplished, said translation module outputs translated said each retrieved document to said opinion analysis module,
wherein said opinion analysis module further includes an opinion intensity scoring unit assigning scores to an intensity of an opinion expressed in documents on said topic of interest and computing the intensity of the opinion expressed in said at least one document d on said topic of interest through the computational sequence of operations selected from a group consisting of:
computational sequence of operations A including;
  extracting a set of sentences a expressing the opinion about said topic of interest from said at least one document d,
  in each said sentence s expressing the opinion about said topic of interest, finding opinion expressing words ω and synonyms ω' thereof,
  for each of said ω and ω', extracting a corresponding score from said Scored Opinion Expressing Words Bank,
  adding said extracted scores for all ω and ω' in said each sentence s, and averaging said added score of all said sentences s in said set thereof in said at least one document d;

computational sequence of operations B including:

assigning "initial" score sc(s) and sc($s_n$) to each sentence s and $s_n$ expressing opinion and not expressing opinion, respectively, on said topic of interest based on said precalculated word scoring functions of at least portion of said predetermined opinion expressing words and phrases contained in said Scored Opinion Expressing Words Bank and detected in said sentences s and $s_n$, splitting said scored sentences s and $s_n$, for each said s and each said $s_n$, finding a distance therebetween in said at least one document d, for each said s, calculating an impact of all $s_n$ thereon, and averaging all sc(s) and impacts of all sc($s_n$);

computational sequence of operations C including:

establishing a list of lexographic templates, applying said lexographic templates to the sentences in said at least one document d, extracting sentences expressing the opinion about said topic of interest in said at least one document d matching at least one of said lexographic templates, and scoring the relevant sentences; and computational sequence of operations D including:

specifying a document collection D, specifying a document collection $D_{test}$, associating with said at least one document d∈D a first scoring vector corresponding to a plurality of scoring techniques, scoring said at least one document d∈D in correspondence with said first scoring vector, associating with each document $d_i \in D_{test}$ a second scoring vector corresponding to a plurality of scoring techniques, scoring each said document $d_i \in D_{test}$ in correspondence with said second scoring vector, scoring each said document $d_i \in D_{test}$ by human individuals, for said scored d∈D, finding r-nearest neighboring documents $d_i$)i=1, . . . , r) scored by the second scoring vector, finding scores assigned by human individuals to said documents $d_i$(I=1, . . . , r), and averaging said scores assigned to said documents $d_i$(i= 1, . . . , r).

11. The system of claim 10, further comprising a multi-dimensional visualization engine operatively coupled to said opinion analysis module to output said calculated opinion intensity in a multi-dimensional format agreeable with a multi-lingual domain of the retrieved documents.

12. The system of claim 11, further comprising an opinion database unit coupled to said opinion analysis module and said multi-dimensional visualization engine, said opinion database unit including a database containing identification information of each retrieved document, topic extracted from said each retrieved document, relevant metadata, and opinion scores of said each retrieved documents.

13. The system of claim 12, further comprising an opinion cache unit operatively coupled to said opinion database unit and said multi-dimensional visualization engine, said opinion cache unit operatively coupled to said opinion database unit and said multi-dimensional visualization engine, said opinion cache unit including a high-speed in-memory server containing precomputed data.

14. A method for analysis of an opinion expressed in documents on a particular topic of interest, comprising the steps of:

specifying sources of documents, topic of interest, and time period of interest using a processor of a data processing system including an opinion analysis module adapted for analyzing documents in at least one respective language;

retrieving documents D on said topic of interest for said time period from said sources of documents;

identifying a language of each document d of said retrieved documents D;

entering said each document d into said opinion analysis module if said identified language of said each document d corresponds to said at least one respective language, otherwise, translating said each document d from said identified language into said at least one respective language, and sending a translated said each document d to said opinion analysis module;

forming a Scored Opinion Expressing Words Bank containing precalculated word scoring functions assigning respective scores to predetermined opinion expressing words and phrases;

computing an intensity of an opinion expressed in said each document d on said topic of interest in said opinion analysis module;

wherein said computation of the intensity of the opinion expressed in said each document d on said topic of interest further comprises the steps of:

extracting a set of sentences s expressing the opinion about said topic of interest from said at least one document d, in each said sentence s expressing the opinion about said topic of interest, finding opinion expressing words ω and synonyms ω' thereof, for each of said ω and ω', extracting a corresponding score from said Scored Opinion Expressing Words Bank, adding said extracted scores for all ω and ω' in said each sentence s, and averaging said added score of all said sentences s in said set thereof in said at least one document d; and outputting said computed intensity of opinion in a multi-dimensional format at an opinion representation unit.

15. The method of claim 14, wherein said intensity of opinion is computed on a substantially continuous numerical scale.

16. The method of claim 14, wherein said intensity of opinion is computed on a binary numerical scale.

17. The method of claim 14, wherein said intensity of opinion is computed qualitatively.

18. The method of claim 14, wherein formation of the Scored Opinion Expressing Words Bank further comprises the steps of:

selecting a collection $D_{test}$ of training documents, scoring opinion intensity of each document in said collection $D_{test}$ by a plurality of human individuals, for each document from said collection $D_{test}$, forming a multiset of said opinion intensities scored by said plurality of human individuals, and scoring opinion expressing words and phrases.

19. A method for analysis of an opinion expressed in documents on a particular topic of interest, comprising the steps of:

specifying sources of documents, topic of interest, and time period of interest using a processor of a data processing system including an opinion analysis module adapted for analyzing documents in at least one respective language;

retrieving documents D on said topic of interest for said time period from said sources of documents;

identifying a language of each document d of said retrieved documents D;

entering said each document d into said opinion analysis module if said identified language of said each document d corresponds to said at least one respective language, otherwise, translating said each document d from said identified language into said at least one respective language, and sending a translated said each document d to said opinion analysis module;

forming a Scored Opinion Expressing Words Bank containing precalculated word scoring functions assigning respective scores to predetermined opinion expressing words and phrases;

computing an intensity of an opinion expressed in said each document d on said topic of interest in said opinion analysis module, wherein said computation of the intensity of the opinion expressed in said each document d on said topic of interest further comprises the steps of:

assigning "initial" score sc(s) and sc($s_n$) to each sentence s and $s_n$ expressing opinion and not expressing opinion, respectively, on said topic of interest based on said precalculated word scoring functions of at least portion of said predetermined opinion expressing words and phrases contained in said Scored Opinion Expressing Words Bank and detected in said sentences s and $s_n$, splitting said scored sentences s and $s_n$, for each said s and each said $s_n$, finding a distance therebetween is said at least one document d, for each said s, calculating an impact of all $s_n$ thereon, and averaging all sc(s) and impacts of all sc($s_n$); and outputting said computed intensity of opinion in a multi-dimensional format at an opinion representation unit.

20. A method for analysis of an opinion expressed in documents on a particular topic of interest, comprising the steps of:

specifying sources of documents, topic of interest, and time period of interest using a processor of a data processing system including an opinion analysis module adapted for analyzing documents in at least one respective language;

retrieving documents D on said topic of interest for said time period from said sources of documents;

identifying a language of each document d of said retrieved documents D;

entering said each document d into said opinion analysis module if said identified language of said each document d corresponds to said at least one respective language, otherwise, translating said each document d from said identified language into said at least one respective language, and sending a translated said each document d to said opinion analysis module;

forming a Scored Opinion Expressing Words Bank containing precalculated word scoring functions assigning respective scores to predetermined opinion expressing words and phrases;

computing an intensity of an opinion expressed in said each document d on said topic of interest in said opinion analysis module, wherein said computation of the intensity of the opinion expressed in said each document d on said topic of interest further comprises the steps of:

establishing a list of lexographic templates, applying said lexographic templates to the sentences in said at least one document d, extracting sentences expressing the opinion about said topic of interest in said at least one document d matching at least one of said lexographic templates, and scoring the relevant sentences; and outputting said computed intensity of opinion in a multi-dimensional format at an opinion representation unit.

21. A method for analysis of an opinion expressed in documents on a particular topic of interest, comprising the steps of:

specifying sources of documents, topic of interest, and time period of interest using a processor of a data processing system including an opinion analysis module adapted for analyzing documents in at least one respective language;

retrieving documents D on said topic of interest for said time period from said sources of documents;

identifying a language of each document d of said retrieved documents D;

entering said each document d into said opinion analysis module if said identified language of said each document d corresponds to said at least one respective language, otherwise, translating said each document d from said identified language into said at least one respective language, and sending a translated said each document d to said opinion analysis module;

forming a Scored Opinion Expressing Words Bank containing precalculated word scoring functions assigning respective scores to predetermined opinion expressing words and phrases;

computing an intensity of an opinion expressed in said each document d on said topic of interest in said opinion analysis module, wherein said computation of the intensity of the opinion expressed in said each document d on said topic of interest further comprises the steps of:

specifying a document collection D, specifying a document collection $D_{test}$, associating with said at least one document d $\in$D a first scoring vector corresponding to a plurality of scoring techniques, scoring said at least one document d$\in$D in correspondence with said first scoring vector, associating with each document $d_i \in D_{test}$ a second scoring vector corresponding to a plurality of scoring techniques, scoring each said document $d_t \in D_{test}$ in correspondence with said second scoring vector, scoring each said document $d_t \in D_{test}$ by human individuals, for said scored d$\in$D, finding r-nearest neighboring documents $d_i$(i=1, . . . , r) scored by the second scoring vector, finding scores assigned by human individuals to said documents $d_i$(I=1, . . . , r), and averaging said scores assigned to said documents $d_i$(i=1, . . . , r) by human individuals; and outputting said computed intensity of opinion in a multi-dimensional format at an opinion representation unit.

22. The method of claim 17, wherein said step of qualitative computation of the intensity of opinion comprises the steps of:

specifying a document collection $D_{test}$, establishing a rating scale including a list of words positioned in a predetermined order of positiveness of an opinion, defining threshold ranges for each word on said rating scale by applying scoring of documents in said document collection $D_{test}$ by human individuals, scoring each said document d quantitatively, and assigning a qualitative rate to each said document d in accordance with said threshold ranges.

23. The method of claim 14, wherein said identification of the language used in said each document d further comprising the steps of:

specifying list of countries, for each country, specifying a list of languages Ai, extracting "n" random words from "n" random documents from said documents collection D, applying a translator "Ai→English" to said "n" random words, calculating a number $N_i$ of words translated into English, if said $N_i$ exceeds a predetermined threshold percentage, declaring the language $A_i$ for said documents D.

\* \* \* \* \*